United States Patent [19]
Sugiyama et al.

[11] Patent Number: 5,547,344
[45] Date of Patent: Aug. 20, 1996

[54] FLUID COMPRESSOR WITH SELECTOR VALVE

[75] Inventors: Akihiko Sugiyama, Fuji; Hideaki Tsuchiyama, Fujinomiya; Toshihiko Futami, Fuji; Hisataka Kato, Fuji; Takao Hoshi, Fuji, all of Japan

[73] Assignee: Kabushiki Kaisha Toshiba, Japan

[21] Appl. No.: 289,371

[22] Filed: Aug. 12, 1994

[30] Foreign Application Priority Data

Mar. 30, 1994 [JP] Japan ................................. 6-060519
Mar. 30, 1994 [JP] Japan ................................. 6-060520

[51] Int. Cl.⁶ ........................... F04B 49/10; F25B 27/00
[52] U.S. Cl. .......................... 417/32; 62/324.6; 62/325; 137/625.43; 251/129.11
[58] Field of Search ....................... 417/32, 63; 418/2; 62/324.1, 324.6, 325, 159, 160; 137/625.43; 251/129.11, 286

[56] References Cited

U.S. PATENT DOCUMENTS

| | | | |
|---|---|---|---|
| 4,702,088 | 10/1987 | Ozu | 62/324.6 |
| 4,825,908 | 5/1989 | Tsuchihashi et al. | 137/625.43 |
| 5,118,260 | 6/1992 | Fraser, Jr. | 417/32 |
| 5,200,872 | 4/1993 | D'Entremont | 417/32 |
| 5,275,008 | 1/1994 | Song et al. | 62/324.6 |

FOREIGN PATENT DOCUMENTS 60-124595  8/1985  Japan.
61-272478  12/1986  Japan.

*Primary Examiner*—Charles Freay
*Attorney, Agent, or Firm*—Cushman Darby & Cushman, LLP

[57] ABSTRACT

A fluid compressor comprising a closed casing, compression mechanism provided in the casing for compressing an uncompressed low-pressure fluid and discharging a compressed high-pressure fluid into an inside space of the casing, and a selector valve attached to the casing and including a valve disk which is rotatable in the casing so as to change the passage of the high-pressure fluid flowing out from the inside space of the casing to an outside space of the casing and to switch the passage of the low-pressure fluid flowing from the outside of the casing into the selector valve to communicate with the compression mechanism.

25 Claims, 15 Drawing Sheets

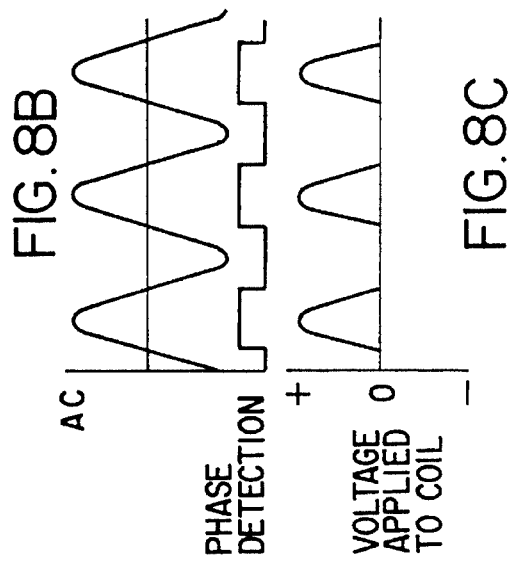
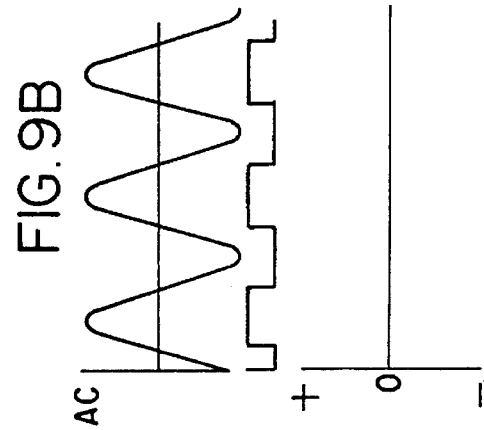
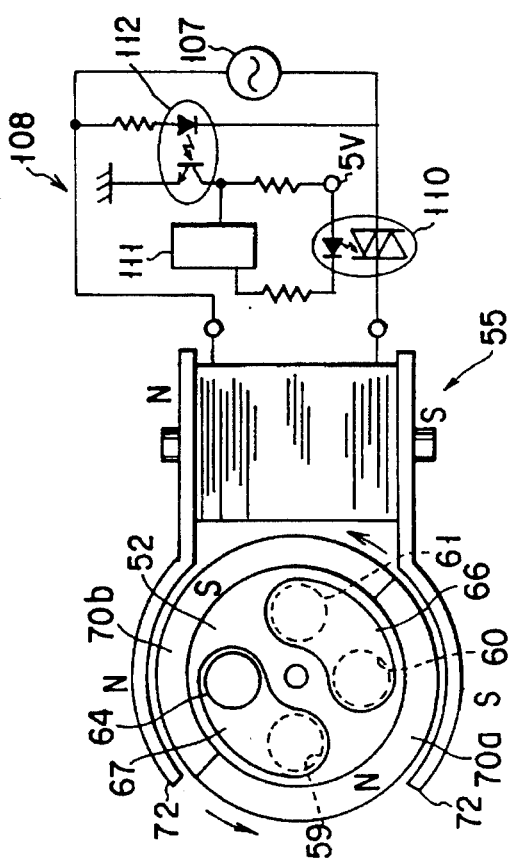
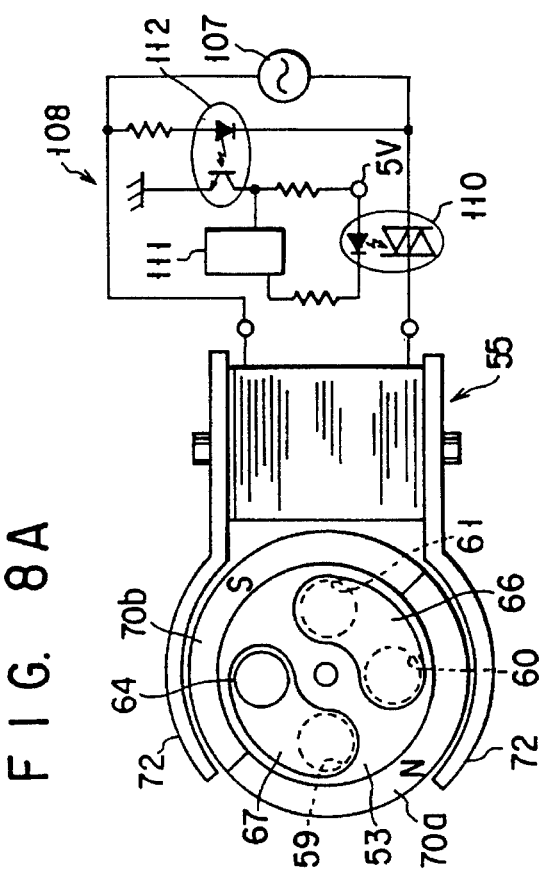

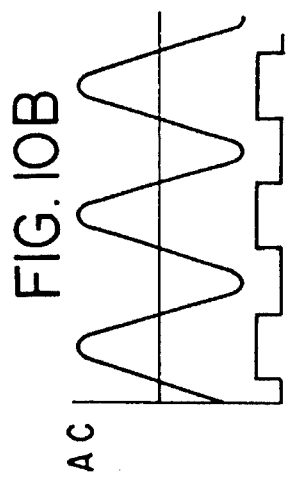
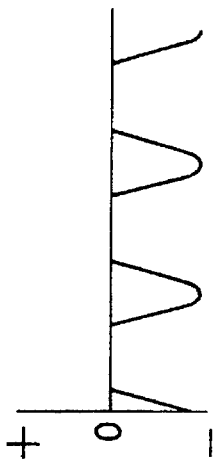
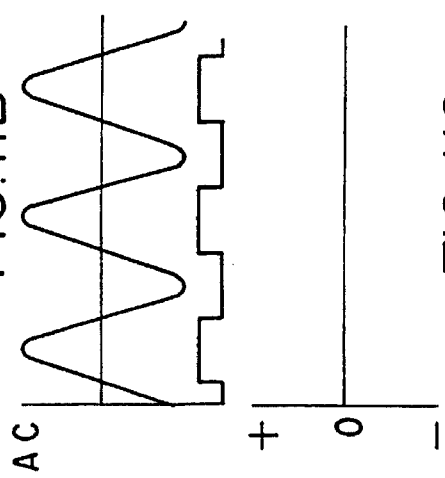
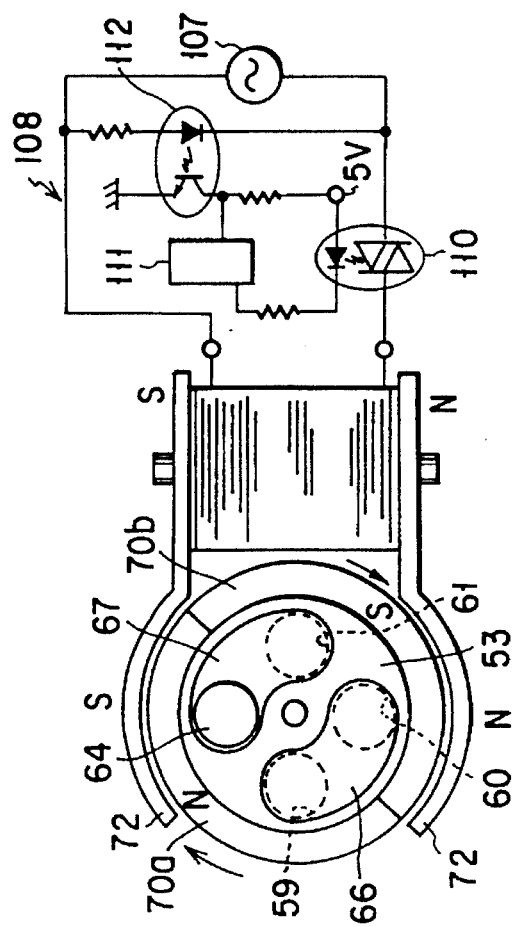
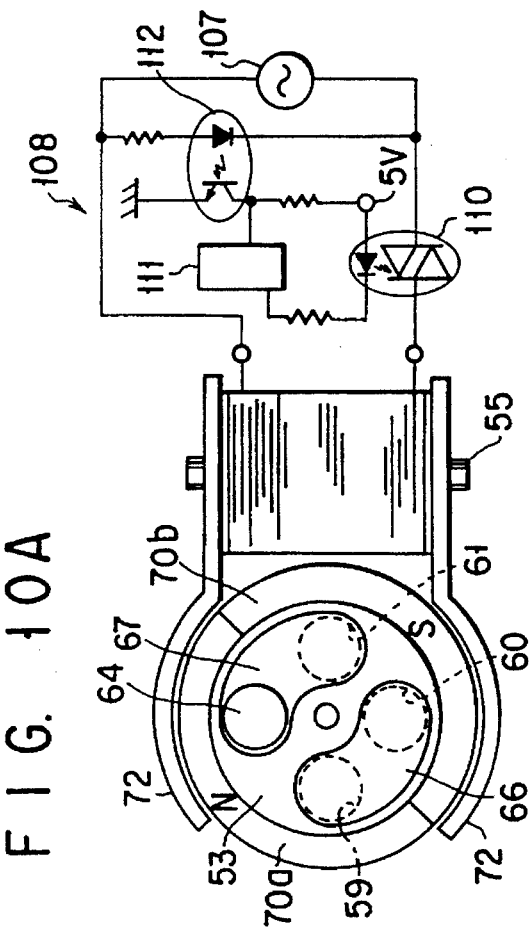

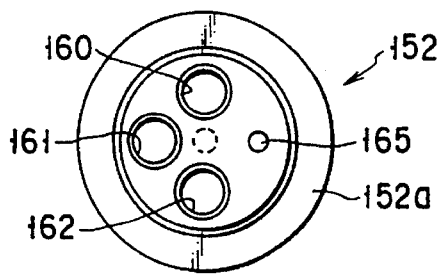
F I G. 14A
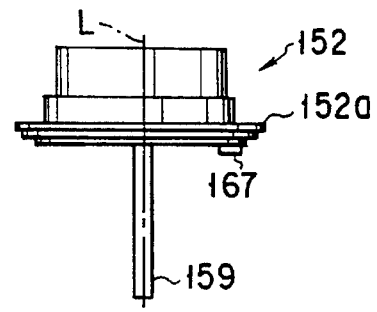
F I G. 14B
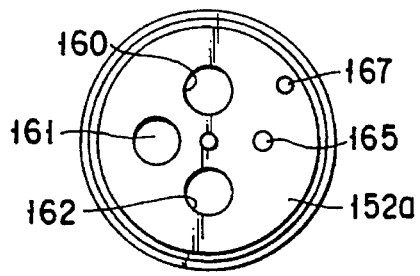
F I G. 14C
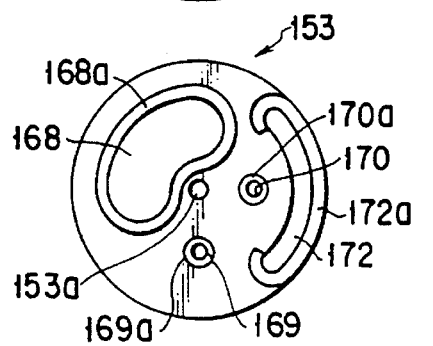
F I G. 15A
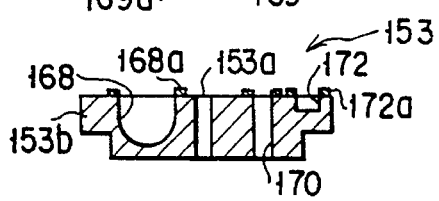
F I G. 15B
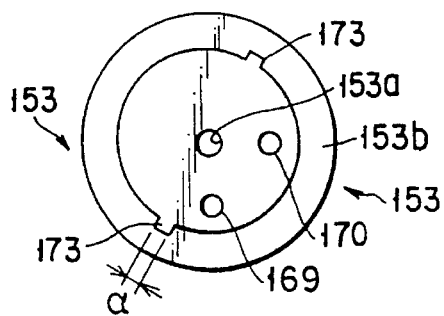
F I G. 15C

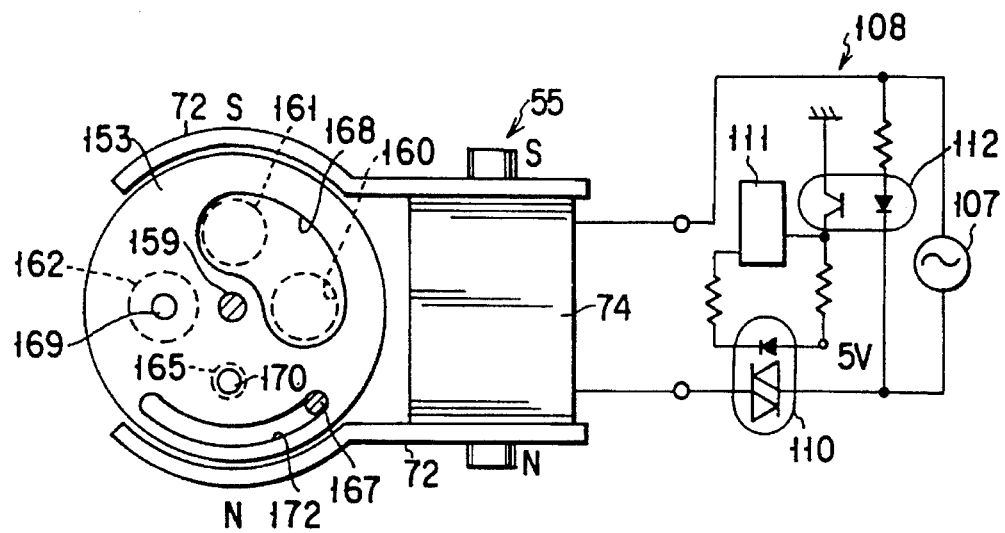
FIG. 20A
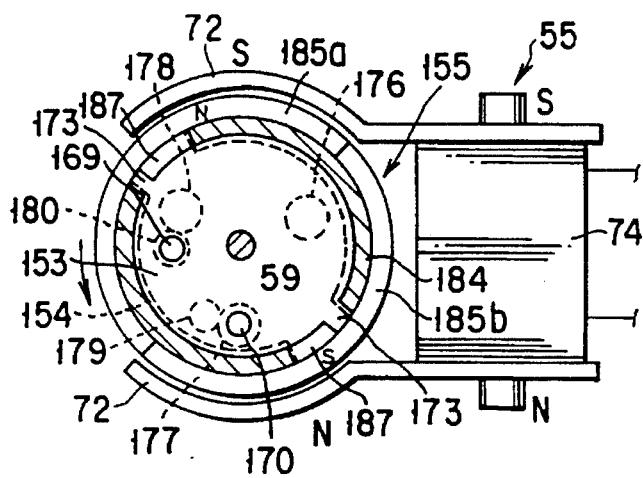
FIG. 20B
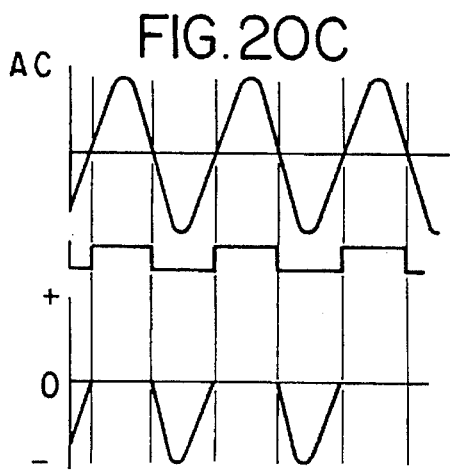
FIG. 20C
FIG. 20D
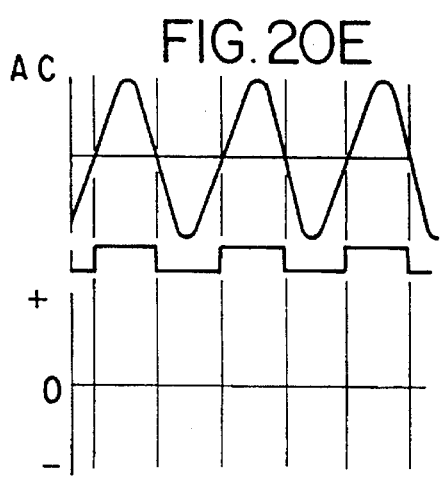
FIG. 20E
FIG. 20F

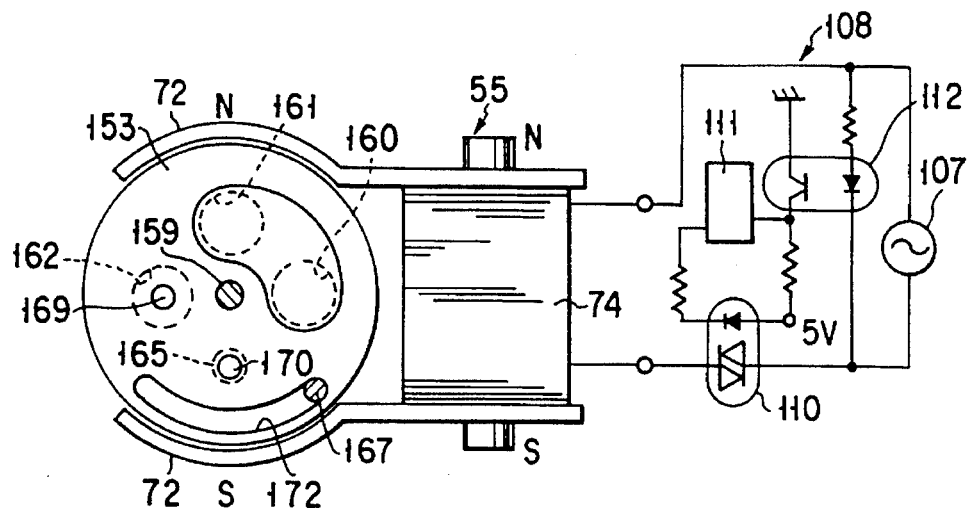
FIG. 21A
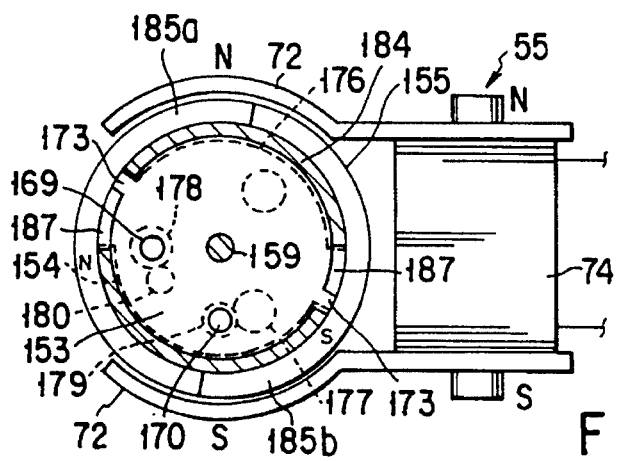
FIG. 21B
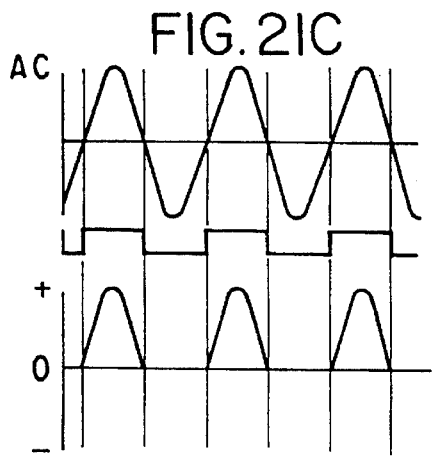
FIG. 21C
FIG. 21D
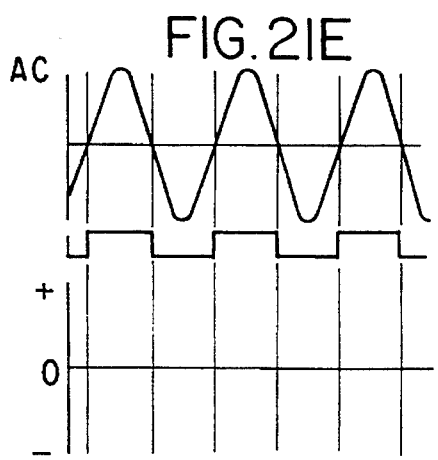
FIG. 21E
FIG. 21F

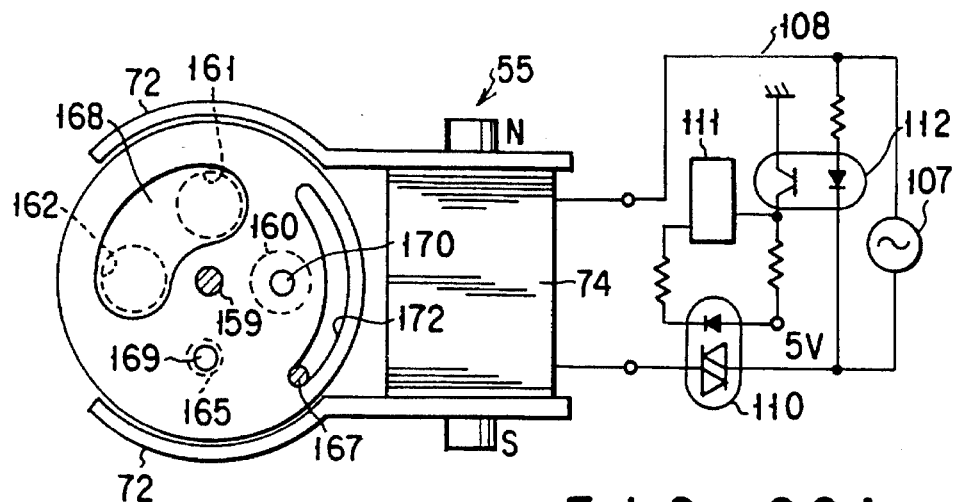
FIG. 22A
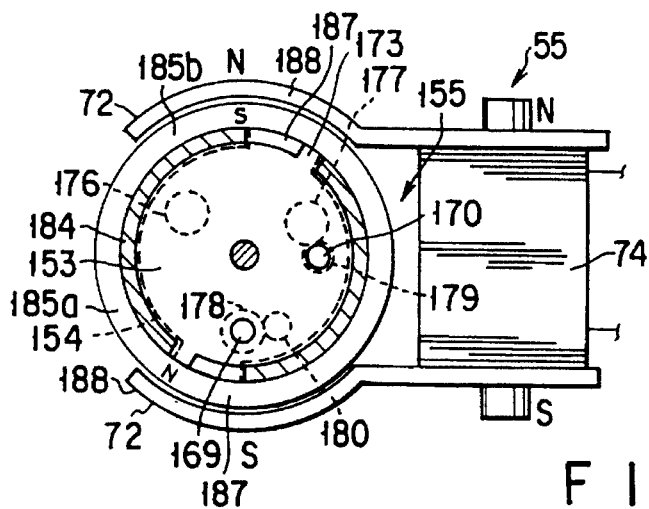
FIG. 22B
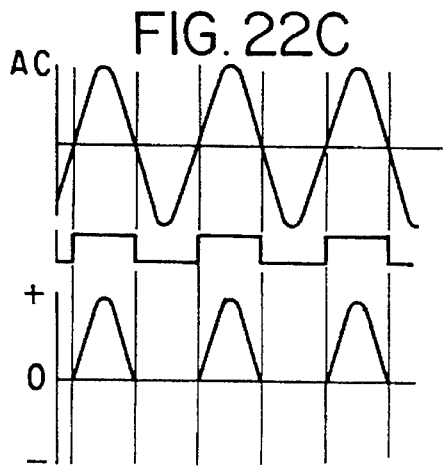
FIG. 22C
FIG. 22D
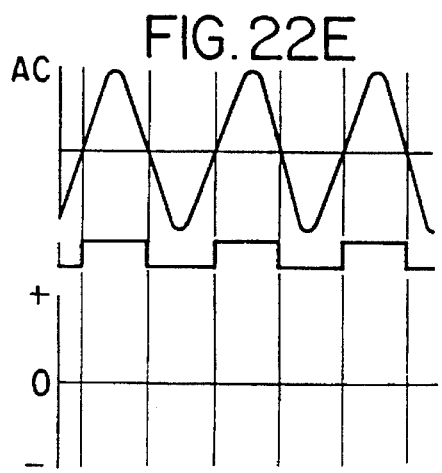
FIG. 22E
FIG. 22F 5,547,344

FLUID COMPRESSOR WITH SELECTOR VALVE

BACKGROUND OF THE INVENTION

1. Field of the Invention

The present invention relates to a fluid compressor used in, for example, an air conditioner, and furnished with a passage selector valve for changing the passage of a working fluid.

2. Description of the Related Art

In general, there are air conditioners which can perform both air cooling and heating operations. These air conditioners are provided with in- and outdoor heat exchangers and a passage selector valve which serves to change the passage of a working fluid circulating in the heat exchangers when the operation mode is changed between air cooling and heating.

As a typical or prevailing example of the passage selector valve, there is a four-way selector valve which is illustrated in FIG. 3 of Jpn. Pat. Appln. KOKAI Publication No. 60-124595. This selector valve comprises a cylindrical main body and a slide valve therein capable of reciprocating along the axis of the body. In this selector valve, the passage is changed by moving the slide valve straight in the main body.

A solenoid valve is connected to the four-way selector valve, and the slide valve is driven actuating the solenoid valve.

The air conditioner, comprising the four-way selector valve and the solenoid valve, however, has the following various problems to be solved.

First, the air conditioner of this type requires use of a plurality of pipes for connecting the four-way selector valve and the solenoid valve, and the pipe arrangement is highly complicated, thus entailing a bulky construction.

The solenoid valve takes out a low-pressure gas from the intake side of the fluid compressor, and feeds it into a predetermined region in the main body, whereupon the slide valve is driven taking advantage of the difference in pressure between the low-pressure gas and a high-pressure gas filling the body. Thus, it is necessary to provide pipes for taking out the low-pressure gas and introducing it into the four-way selector valve, which require a wide layout space.

The four-way selector valve and the solenoid valve both require a certain length to permit reciprocation. Therefore, the structure which combines these valves cannot be reduced without limitation in size.

Meanwhile, the low-pressure gas pipes for connecting the four-way selector valve and the solenoid valve are very slender capillary tubes (small-diameter copper tubes), and can be deformed and caused to malfunction by a small impact. Since the capillary tubes of the air conditioner are exposed to the outside, they can be easily deformed in particular.

Secondly, the air conditioner requires high-pressure gas pipes for connecting the discharge side of the fluid compressor and the four-way selector valve. Since these pipes are connected to the discharge side of the compressor, they are liable to transmit pulsation (oscillation) of the discharged high-pressure gas to the selector valve. It is necessary, therefore, to take a measure for vibration damping.

As a measure to solve this problem, there is a conventional system which is illustrated in FIG. 4 of Jpn. Pat. Appln. KOKAI Publication No. 60-124595.

This system is a compressor of a type such that a closed casing, which houses a compressor unit and an electric motor unit, is filled with a high-pressure gas discharged from the compressor unit, the casing containing the four-way selector valve and the solenoid valve therein.

Since the four-way selector valve and the solenoid valve are located in the casing of the fluid compressor which is filled with the high-pressure gas, the high-pressure gas pipes can be omitted, and the capillary tubes connecting these valves can be effectively prevented from being damaged by external force.

However, this arrangement cannot solve the first problem that the four-way selector valve and the solenoid valve are complicated and bulky, and arouses another problem that the incorporation of these valves in the casing increases the size of the fluid compressor itself.

Since the four-way selector valve is designed so that the passage is changed by sliding the slide valve in its body, moreover, the slide valve must be intimately in contact with the valve seat at all times. Accordingly, the gas cannot be leaked from between the slide valve and the valve seat when the operation is suspended, so that the pressures in the gas pipes of the air conditioner cannot be balanced with ease.

If the pressures in the gas pipes of the air conditioner cannot be quickly balanced, then restart of the operation after suspension and change of the operation mode between air cooling and heating cannot be carried out with speed.

In an air conditioner adapted for heating operation, on the other hand, if the outdoor heat exchanger is frosted, its performance will be lowered. Conventionally, in the air conditioner of this type, the outdoor heat exchanger is defrosted by supplying a high-temperature, high-pressure gas from the compressor to this heat exchanger through a bypass pipe. In this case, a selector valve for the bypass pipe is provided in addition to the four-way selector valve.

Using the two selector valves, however, this method entails a complicated pipe arrangement. If the bypass selector valve is located in the casing of the fluid compressor, the compressor is further increased in size. Also, more electric wires are led out from the casing, and require a complicated control circuit therefor.

SUMMARY OF THE INVENTION

An object of the present invention is to provide a fluid compressor capable of simplifying the pipe arrangement of an air conditioner, enjoying a compact structure containing a selector valve, and ensuring quick and easy gas-pressure balancing for the suspension of operation.

Another object of the present invention is to provide a fluid compressor with a built-in selector valve, capable of performing defrosting operation by means of a simple structure without suspending heating operation.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 8A is a diagram for illustrating the position of the valve disk during transition to air cooling operation and a control circuit;

FIG. 8B is a waveform diagram showing voltage applied to an electromagnet;

FIG. 9A is a diagram for illustrating the position of the valve disk during the air cooling operation and the control circuit;

FIG. 9B is a waveform diagram showing the voltage applied to the electromagnet;

FIG. 10A is a diagram for illustrating the position of the valve disk during transition to the air cooling operation and the control circuit;

FIG. 10B is a waveform diagram showing the voltage applied to the electromagnet;

FIG. 11A is a diagram for illustrating the position of the valve disk during the air cooling operation and the control circuit;

FIG. 11B is a waveform diagram showing the voltage applied to the electromagnet;

FIG. 14A is a top view of a valve base of the selector valve section;

FIG. 14B is a front view of the valve base of the selector valve section;

FIG. 14C is a bottom view of the valve base of the selector valve section;

FIG. 15A is a top view of a first valve disk;

FIG. 15B is a longitudinal sectional view of the first valve disk taken along line 15B—15B of FIG. 15A;

FIG. 15C is a bottom view of the first valve disk;

FIG. 20A is a diagram for illustrating the positional relation between the valve base and the first valve disk during heating operation and a control circuit;

FIG. 20B is a diagram for illustrating the positional relation between the first and second valve disks during the heating operation;

FIG. 20C is a waveform diagram showing voltage applied to an electromagnet at the start of the heating operation;

FIG. 20D is a waveform diagram showing the voltage applied to the electromagnet during the heating operation;

FIG. 21A is a diagram for illustrating the positional relation between the valve base and the first valve disk during defrosting operation and a control circuit;

FIG. 21B is a diagram for illustrating the positional relation between the first and second valve disks during the defrosting operation;

FIG. 21C is a waveform diagram showing the voltage applied to the electromagnet at the start of the defrosting operation;

FIG. 21D is a waveform diagram showing the voltage applied to the electromagnet during the defrosting operation;

FIG. 22A is a diagram for illustrating the positional relation between the valve base and the first valve disk during the air cooling operation and the control circuit;

FIG. 22B is a diagram for illustrating the positional relation between the first and second valve disks during the air cooling operation;

FIG. 22C is a waveform diagram showing the voltage applied to the electromagnet at the start of the air cooling operation;

FIG. 22D is a waveform diagram showing the voltage applied to the electromagnet during the air cooling operation;

DETAILED DESCRIPTION OF THE PREFERRED EMBODIMENTS

A first embodiment of the present invention will now be described with reference to accompanying drawings.

Figure 1:
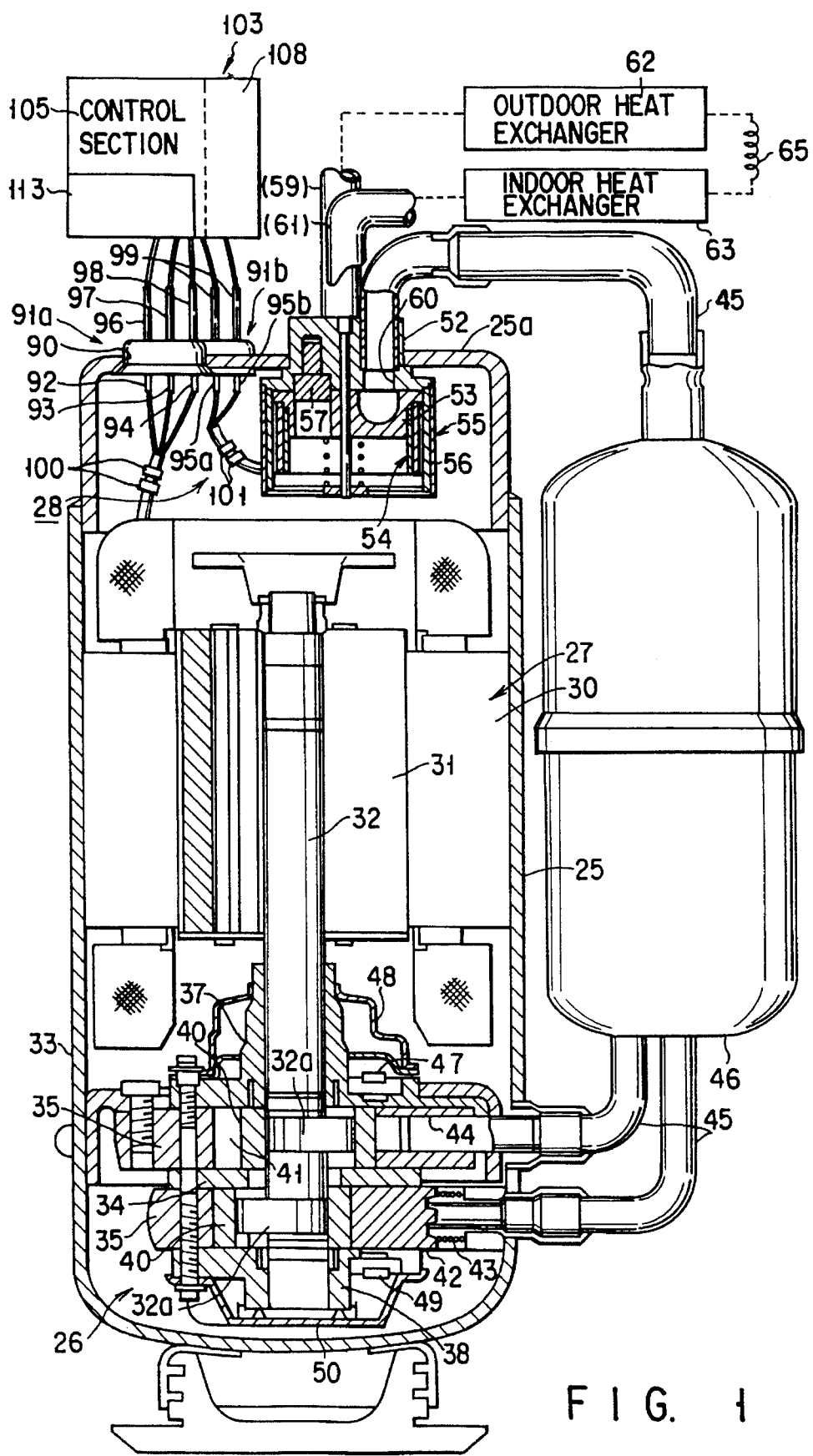
FIG. 1 is a longitudinal sectional view showing a fluid compressor according to a first embodiment of the present invention.

In FIG. 1, numeral 25 denotes a closed casing. Arranged in the casing 25 are a compression mechanism 26 at the lower end portion thereof with respect to the height direction, an electric motor 27 at the middle portion for driving the mechanism 26 for compressive operation, and a selector valve section 28 at the upper end portion which constitutes the principal part of the present invention.

The following is a description of the arrangement of the various components.

The electric motor 27 includes a brushless DC motor which is composed of a stator 30 fixed to the inner surface of the closed casing 25 and a rotor 31 located inside the stator 30. The rotor 31 is fitted on the upper end portion of a drive shaft 32.

The lower end portion of the drive shaft 32 extends into the compression mechanism 26. The lower end portion of the shaft 32 is formed having two crank portions (eccentric portions) 32a which are arranged at a predetermined vertical distance and with a phase difference of 180° from each other.

The compression mechanism 26 is held by means of a partition plate 33 which is fixed in the casing 25. The mechanism 26 is provided with two hollow cylinders 35 which are connected vertically to each other by means of an intermediate plate 34. The two crank portions 32a of the drive shaft 32 are situated individually in the cylinders 35.

The shaft 32 is supported for rotation around a vertical axis by means of a main bearing 37, which is fixed to the partition plate 33, and an auxiliary bearing 38. The main and auxiliary bearings 37 and 38 close the upper and lower ends, respectively, of the two cylinders 35.

A hollow cylindrical roller 40 is fitted on each of the two crank portions 32a of the shaft 32. Since each crank portion 32a is eccentric to the axis of rotation of the shaft 32, the roller 40 is located eccentrically in its corresponding cylinder 35.

Also, each roller 40 is held in a manner such that part of its outer peripheral surface is in contact with the inner peripheral surface of its corresponding cylinder 35. Thus, a compression space 41 with a crescent cross section is defined between the inner peripheral surface of each cylinder 35 and its corresponding eccentric roller 40.

Each cylinder 35 contains a blade 42 which divides the compression space 41 into two parts, high-pressure side and low-pressure side. (The blade 42 for the cylinder 35 on the upper side is not shown in FIG. 1.)

The blade 42 is urged toward the roller 40 by means of a spring 43 so that it gets into and out of a blade groove (not shown) in the cylinder 35, with its distal end always in contact with the outer peripheral surface of the roller 40.

An intake passage 44 and a discharge passage are formed on either side of the blade 42 in the cylinder 35. An uncompressed refrigerant gas (low-pressure gas) is sucked into the compression space 41 through the intake passage 44, while a compressed refrigerant gas (high-pressure gas) is discharged through the discharge passage. The intake passage 44 of the lower cylinder 35 is not shown in FIG. 1. The discharge passage will be mentioned later.

An intake pipe 45 is connected to each intake passage 44. The pipe 45 extends to the outside of the closed casing 25, and is then guided upward along the outer surface of the casing 25. A gas-liquid separator 46 is attached to the middle portion of the intake pipe 45.

The discharge passage is composed of first and second passages. The first passage opens in the top portion of the casing 25 via a first discharge valve 47, which is attached to a flange portion of the main bearing 37, and a first muffler 48. The second passage communicates with a second muffler 50 by means of a second discharge valve 49, which is attached to a flange portion of the auxiliary bearing 38, and also opens in the top portion of the casing 25 via a through hole (not shown) which penetrates the cylinders 35, intermediate plate 34, and main bearing 37.

After the uncompressed low-pressure gas is sucked through the intake pipes 45 into the cylinders 35 and compressed by rotation of the rollers 40, in this arrangement, it is discharged into the upper portion of the casing 25 through the discharge passage which is formed of the first and second passages.

The interior of the casing 25 can be kept at a predetermined high pressure by being filled with the high-pressure gas discharged through the first and second passages.

Referring now to FIGS. 1 to 11, the selector valve section 28 will be described.

Figure 2A:
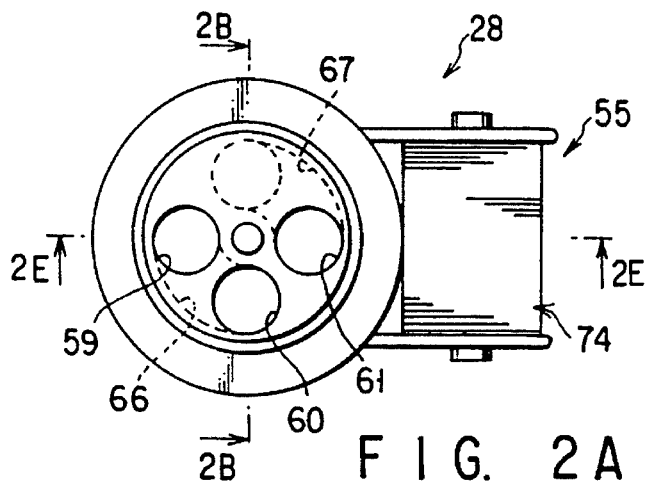
FIG. 2A is a plan view of a selector valve section.
Figure 2B:
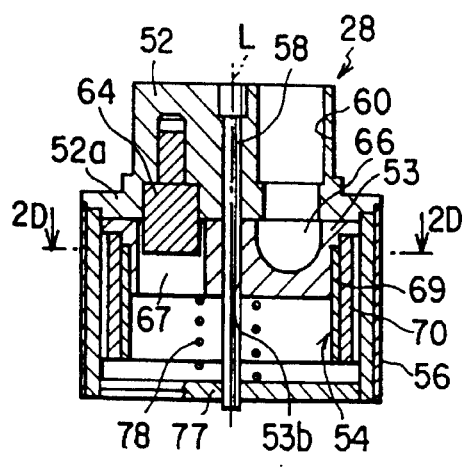
FIG. 2B is a longitudinal sectional view of the selector valve section taken along line 2B—2B of FIG. 2A.

As shown in FIGS. 1, 2A and 2B, the selector valve section 28 comprises a valve base 52, valve disk 53, magnet member 54, magnetism switching unit 55, and holder 56. The valve base 52 is fixed to closed member 25. The valve disk 53 is rotatably attached to the lower surface of the base 52, and serves to change the passage for a working fluid (refrigerant gas). The magnet member 54 is fixed to the outer edge portion of the disk 53 with respect to the diametrical direction thereof. The magnetism switching unit 55 applies a magnetic force to the magnet member 54, thereby driving the valve disk 53 to change the passage. The holder 56 covers the valve 28.

Figure 3A:
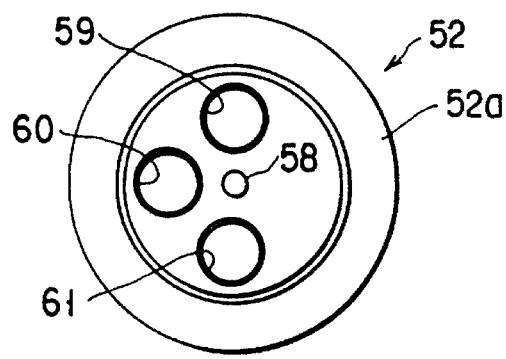
FIG. 3A is a top view of a valve base of the selector valve section.
Figure 3B:
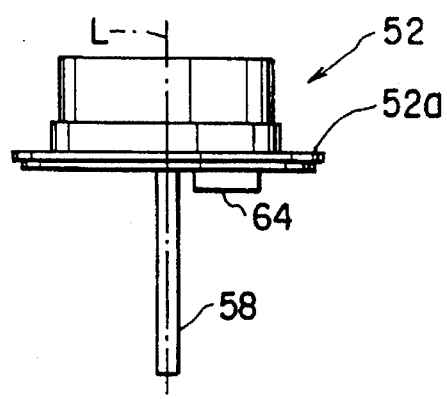
FIG. 3B is a front view of the valve base of the selector valve section.
Figure 4B:
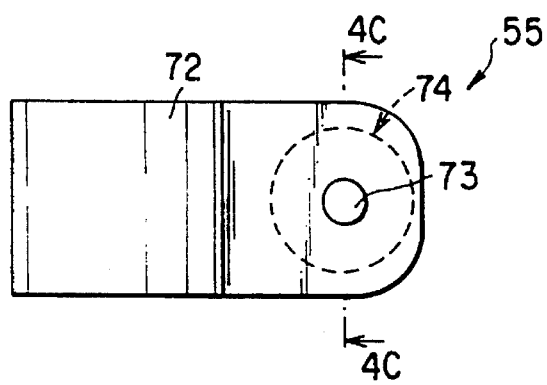
FIG. 4B is a front view of the magnetism switching unit.
Figure 3C:
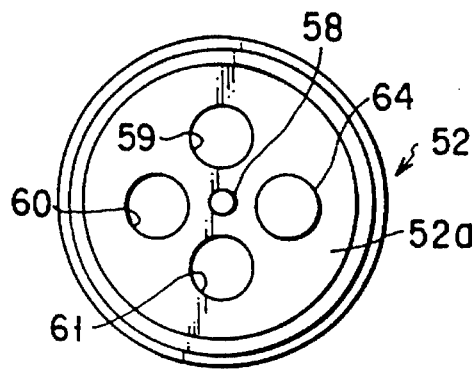
FIG. 3C is a bottom view of the valve base of the selector valve section.
Figure 4C:
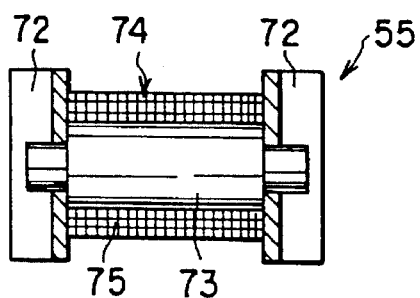
FIG. 4C is a longitudinal sectional view of the magnetism switching unit taken along line 4C—4C of FIG. 4B.

The valve base 52 is circular in plane shape, as shown in FIGS. 3A and 3C, and has a collar portion 52a on its lower end portion, which is larger in diameter than the upper end portion of the base 52. As shown in FIG. 1, moreover, the valve base 52 is mounted on a cover portion 25a which closes the upper end of the closed casing 25.

A through hole 57 is bored through the top wall of the cover portion 25a, as shown in FIG. 1. The valve base 52 is attached to the cover portion 25a in a manner such that its upper end portion is fitted in the through hole 57, and is fixed by, e.g., welding so as to close the hole 57 airtightly.

As shown in FIGS. 3A to 3C, moreover, the upper end portion of a center shaft 58 is fixed to the valve base 52. The shaft 58 extends along the central axis L of the base 52, and its lower end portion projects into the casing 25. Also, the valve base 52 has three ports 59, 60 and 61 which are arranged circumferentially at intervals of 90° around the shaft 58 and axially penetrate the base 52.

The central port 60, among these three ports 59 to 61, is connected to the intake pipes 45 extending from the compression mechanism 26, as shown in FIG. 1, and serves as a low-pressure gas port. The two other ports 59 and 61, having the low-pressure gas port 60 between them, serve as first and second connecting ports which are connected to out- and indoor heat exchangers 62 and 63, respectively, as shown in FIG. 1.

As shown in FIGS. 3B and 3C, moreover, a stopper 64 is embedded in that portion of the valve base 52 which is situated at a circumferential distance of 180° from the low-pressure gas port 60. The lower end portion of the stopper 64 projects a little from the lower surface of the base 52.

As shown in FIGS. 1 and 2B, the stopper 64 is mounted in a manner such that its upper end portion is screwed in the valve base 52. That part of the stopper 64 which projects from the lower surface of the base 52 has an outer diameter a little smaller than the inner diameter of each of the three ports 59 to 61.

As shown in FIG. 2B, the valve disk 53 is mounted on the lower surface of the valve base 52 formed in this manner. The disk 53 is rotatably attached to the base 52 in a manner such that the center shaft 58 protruding from the valve base 52 is passed through a center hole 53a in the central portion of the disk 53, and the upper surface of the disk 53 is substantially in contact with the lower surface of the valve base 52.

Figure 5A:
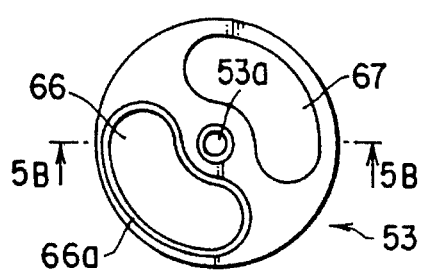
FIG. 5A is a top view of a valve disk.

As shown in FIG. 5A, a depression 66 is formed in the upper surface of the valve disk 53. The depression 66 is a passage which has an inner surface with a semicircular profile, as shown in FIG. 5B, and is designed so that it can allow each two adjacent ports (59 and 60 or 60 and 61) spaced at a distance of 90°, among the three ports 59 to 61, to communicate alternatively with each other.

Thus, when the valve disk 53 is rotated through 90°, each two adjacent ports, that is, the low-pressure gas port 60 and the first connecting port 59 or the port 60 and the second connecting port 61, are allowed alternatively to communicate with each other, as shown in FIGS. 8A, 9A, 10A and 11A.

As shown in FIG. 5A, a sealing member 66a is formed on the upper surface of the valve disk 53 in an integral manner so as to surround the depression 66. The member 66a serves to seal the gap between the upper surface of the disk 53 and the lower surface of the valve base 52 airtightly.

Figure 5B:
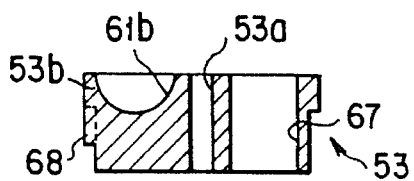
FIG. 5B is a longitudinal sectional view of the valve disk taken along line 5B—5B of FIG. 5A.
Figure 5C:
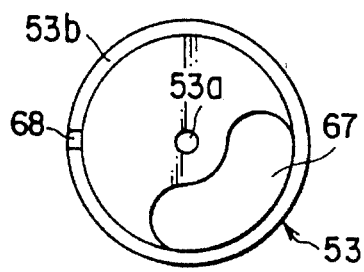
FIG. 5C is a bottom view of the valve disk.

As shown in FIGS. 5A to 5C, moreover, a through hole 67 penetrates the valve disk 53 from top to bottom. The hole 67 is situated in a position such that itself and the depression 66 are symmetrical with respect to the center hole 53a. As shown in FIG. 5A, the through hole 67 has a plane shape similar to that of the depression 66. As shown in FIG. 5B, however, the disk 53 is axially penetrated by the hole 67, whereas it is not by the depression 66.

AS shown in FIG. 2B, furthermore, the projecting lower end portion of the stopper 64 attached to the valve base 52 is situated in the through hole 67 in a manner such that the upper surface of the valve disk 53 is intimately in contact with the lower surface of the base 52.

Figure 2C:
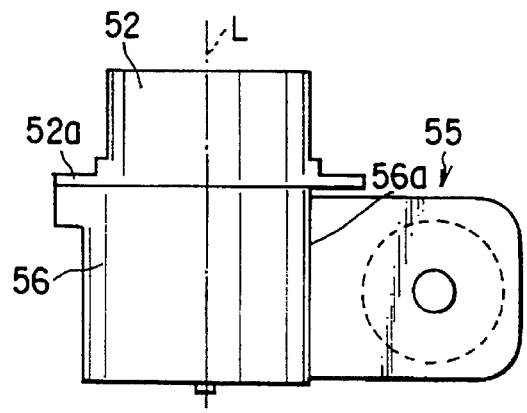
FIG. 2C is a front view of the selector valve section.
Figure 2D:
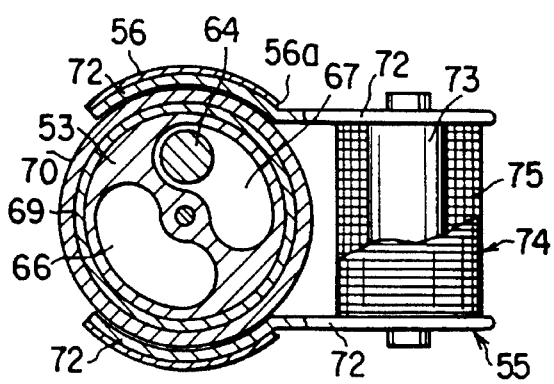
FIG. 2D is a cross-sectional view of the selector valve section taken along line 2D—2D of FIG. 2B.

As shown in FIG. 2D, the stopper 64 is designed so as to abut against one or the other end of the through hole 67 with respect to the circumferential direction, thereby restricting the rotational movement of the valve disk 53 within the range of 90°. By rotating the disk 53 is within the range of 90°, the through hole 67 can be shifted so as to communicate alternatively with the first or second connecting port 59 or 61.

The depression 66 and the through hole 67 are shaped and relatively positioned that the second connecting port 61 and the low-pressure gas port 60 communicate with each other by means of the depression 66 when the first connecting port 59 communicates with the hole 67, as shown in FIGS. 8A and 9A.

As shown in FIGS. 10A and 11A, the first connecting port 59 and the low-pressure gas port 60 communicate with each other by means of the depression 66 when the second connecting port 61 communicates with the through hole 67.

The through hole 67, which opens into the casing 25, serves as a high-pressure gas port.

As shown in FIG. 5B, the upper end portion of the valve disk 53 forms a collar or flange portion 53b which projects slightly outward in the diametrical direction of the disk 53. A projection 68 for positioning, which is adapted to engage the magnet member 54, is formed in a predetermined position on the underside of the flange portion 53b with respect to the circumferential direction.

Figure 6A:
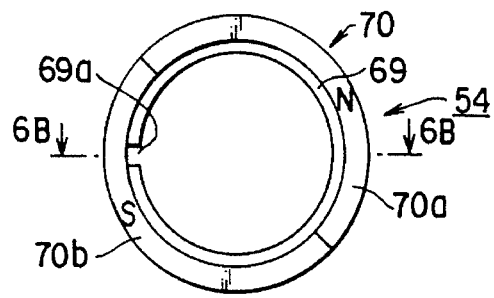
FIG. 6A is a top view of a magnet member.
Figure 6B:
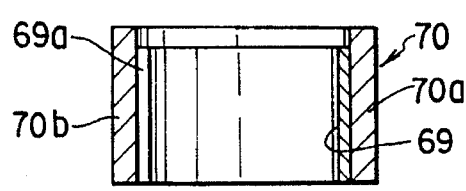
FIG. 6B is a longitudinal sectional view of the magnet member taken along line 6B—6B of FIG. 6A.

As shown in FIGS. 2B, 6A and 6B, the magnet member 54 is composed of a thin-walled cylindrical collar 69 fitted on the lower end portion of the valve disk 53 and a permanent magnet 70 fixed to the outer surface of the collar 69.

As shown in FIG. 6A, a slit 69a is formed in a part of the collar 69 in the circumferential direction. The magnet member 54 is combined with the valve disk 53 so as not to be relatively rotatable, with its slit 69a in alignment and engagement with the projection 68 of the valve disk 53.

As shown in FIG. 6A, moreover, the permanent magnet 70 is divided diametrically into two parts, a north-pole portion 70a and a south-pole portion 70b. The magnet member 54 is driven by means of forces of attraction and repulsion between itself and the magnetism switching unit 55.

As shown in FIGS. 2D, 4A, 4B and 4C, the magnetism switching unit 55 includes a pair of belt-shaped iron stays 72, spaced and extending parallel to each other, and an electromagnet 74 interposed between the respective proximal end portions of the stays 72. The electromagnet 74 is composed of an iron core 73, having its opposite ends fixed individually to the stays 72, and a lead wire 75 wound on the core 73.

As shown in FIG. 2D, the distal end portion of each stay 72 is curved so as to extend along the outer peripheral surface of the permanent magnet 70 which is fixed to the valve disk 53. The radius of curvature of the distal end portion is a little longer than the outer diameter of the permanent magnet 70 so that a predetermined minute gap is secured between the inner surface of the stay 72 and the outer peripheral surface of the magnet 70.

Figure 4A:
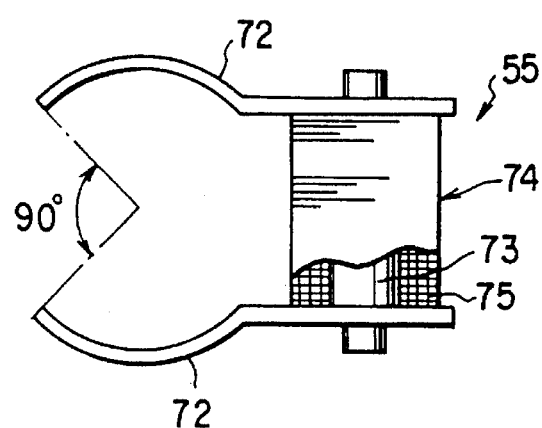
FIG. 4A is a plan view, partially perspective, showing a magnetism switching unit.

As shown in FIG. 4A, the respective distal ends of the two stays 72 are spaced at an angle of about 90° from each other in the direction of curvature of the stays 72.

The magnetism switching unit 55 can magnetize the pair of stays 72 so that they are different in polarity (north or south) by applying a DC current to the lead wire 75 of the electromagnet 74. As the polarity of the stays 72 is switched, the magnet member 54 (valve disk 53) is rotated by attraction and repulsion to the permanent magnet 70.

As shown in FIGS. 2B to 2E, a holder 56 is located outside the distal end portions of the stays 72. The holder 56 is a thin-walled cylindrical member, whose upper end portion is fixed to the lower surface of the outer edge portion of the collar portion 52a of the valve base 52.

As shown in FIGS. 2C and 2D, the holder 56 is provided with a notch portion 56a through which the proximal end portions (on the side of the electromagnet 74) of the stays 72 are taken out of the holder 56. The notch portion 56a of the holder 56 serves to position the magnetism switching unit 55 and prevents it from rotating.

Figure 2E:
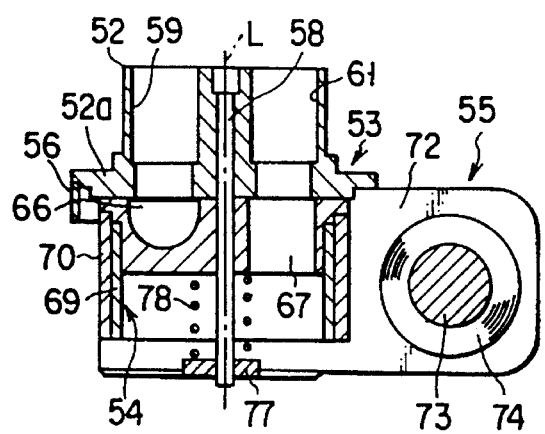
FIG. 2E is a longitudinal sectional view of the selector valve section taken along line 2E—2E of FIG. 2A.

As shown in FIGS. 2B and 2E, on the other hand, a backup member 77 is fixed to the respective lower ends of the holder 56 and the center shaft 58, which protrudes from the valve base 52 and extends downward through the valve disk 53.

The backup member 77 is a belt-shaped plate whose longitudinally opposite end portions are fixed to the lower end of the holder 56 by welding. The central portion of the member 77 is screwed on the lower end of the center shaft 58.

As shown in FIGS. 2B and 2E, a spring 78 is interposed axially compressed between the central portion of the backup member 77 and the lower surface of the valve disk 53, whereby the disk 53 and the magnet member 54 are pressed against the lower surface of the valve base 52.

The urging force of the spring 78 is adjusted to a level such that a minute gap is allowed to be formed between the upper surface of the valve disk 53 and the lower surface of the valve base 52 by the weight of the disk 53 when the compressor is nonoperating, that is, when the pressure in the casing 25 is low.

The following is a description of the way of assembling the selector valve section 28 with this construction.

In assembling the selector valve section 28, the holder 56 is first fixed to the valve base 52. On the other hand, the magnet member 54 is bonded to the outer peripheral surface of the valve disk 53 in advance.

Then, the upper end portion of the valve base 52 is inserted into the through hole 57 in the cover portion 25a of the closed case 25, and is welded to be fixed.

Thereafter, the valve disk 53, having the magnet member 54 bonded thereto, is mounted on the center shaft 58 of the valve base 52, and the magnetism switching unit 55 is attached. Finally, the backup member 77 is fixed to the respective lower ends of the shaft 58 and the holder 56 in a manner such that the spring 78 is compressed thereby.

Figure 7:
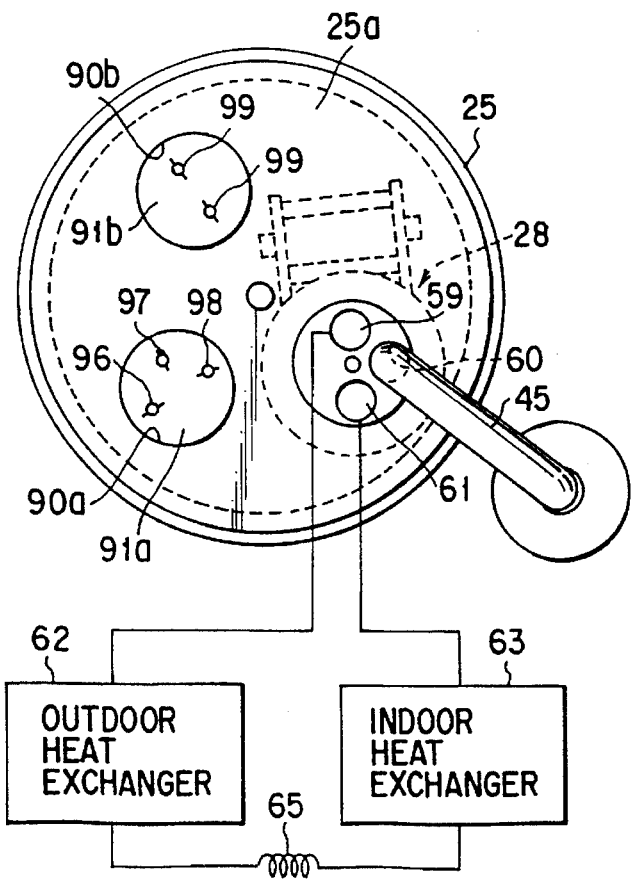
FIG. 7 is a top view of the fluid compressor.

As shown in FIGS. 1 and 7, on the other hand, second and third through holes 90a and 90b are formed in the cover portion 25a so as to be situated beside the selector valve section 28. First and second enclosed terminals 91a and 91b are fitted in the through holes 90a and 90b, respectively, so as to close them airtightly.

The enclosed terminals 91a and 91b are used to take out wires for feeding power to the electric motor 27 and the magnetism switching unit 55 of the selector valve section 28 from the casing 25.

As shown in FIG. 1, the first enclosed terminal 91a includes first, second, and third inside terminals 92, 93 and 94, which project inside the casing 25, and first, second, and third outside terminals 96, 97 and 98, which are connected to the terminals 92, 93 and 94, respectively, and project outside the casing 25.

Likewise, the second enclosed terminal 91b includes a pair of inside terminals 95, which project inside the casing 25, and a pair of outside terminals 99, which project outside the casing 25.

The first to third inside terminals 92 to 94 of the first enclosed terminal 91a are connected to three lead wires from a three-phase winding of the electric motor 27 by means of a pair of first connectors 100, individually. The pair of inside terminals 95 of the second enclosed terminal 91b are connected to two lead wires from the selector valve section 28 by means of a pair of second connectors 101, individually.

Thus, in assembling the compressor, the selector valve section 28 and the first and second enclosed terminals 91a and 91b are mounted on the cover portion 25a, and the second connector 101 extending from the pair of inside terminals 95 of the second enclosed terminal 91b and the second connector 101 from the valve section 28 are first connected to each other.

Then, in attaching the cover portion 25a to the casing 25, the first connector 100 extending from the first to third inside terminals 92 to 94 of the first enclosed terminal 91a and the first connector 100 from the electric motor 27 are connected to each other.

Finally, the cover portion 25a is attached and welded to the casing 25. Thereupon, the fluid compressor is completed.

On the other hand, the outside terminals 96 to 99 of the first and second enclosed terminals 91a and 91b are connected to a control section 103.

The control section 103 comprises an inverter circuit 105 for driving the electric motor 27 of the compressor and a control circuit 108 for driving the selector valve section 28.

Wires from the first to third outside terminals 96 to 98 of the first enclosed terminal 91a are connected to the inverter circuit 105.

The outside terminals 99 of the second enclosed terminal 91b are connected to the control circuit 108. The circuit 108 is constructed in the manner shown in FIG. 8A, for example.

More specifically, current from an AC power source 107 is supplied to the electromagnet 74 of the magnetism switching unit 55 through a phototriac 110 for half-wave control. A microcomputer 111 and a phototransistor 112 for detecting the timing for AC 0 volt (zero-cross point) are used to determine whether or not to energize the phototriac 110 and output the decision.

Thus, the control circuit 108 can apply a positive voltage shown in the waveform diagram of the FIG. 8B or a negative voltage shown in FIG. 10B to the electromagnet 74 in accordance with a command from the microcomputer 111. As shown in FIGS. 9B and 11B, moreover, the circuit 108 can stop the application of the voltage.

Accordingly, the magnetism switching unit 55 can switch the polarity (north or south) of the pair of stays 72, as shown in FIGS. 8A and 10A, and can also stop the generation of magnetism, as shown in FIGS. 9A and 11A.

As shown in FIG. 1, moreover, the control section 103 is provided with a casing temperature sensor unit 113 for detecting the temperature in the casing 25.

The casing temperature sensor unit 113 is connected to wires outside terminals 99 of the second enclosed terminal 91b, for example, and detects the electrical resistance of the lead wire 75 wound on the electromagnet 74 of the magnetism switching unit 55. The unit 113 detects the temperature in the casing 25 in accordance with the detected resistance value. This detection is based on the fact that the electrical resistance of the lead wire 75 varies depending on the ambient temperature (temperature in the casing).

The following is a description of the control (operation) of an air conditioner which is furnished with the compressor described above.

Control for air cooling operation will be described first.

In the air cooling operation, the voltage applied to the electromagnet 74 of the magnetism switching unit 55 is controlled in the manner shown in the waveform diagram of FIGS. 8B and 8C. As a result, the stay 72 on the upper side of FIG. 8A is magnetized into a north pole, and the lower stay 72 into a south pole.

Accordingly, the south-pole portion 70b of the permanent magnet 70 fixed to the valve disk 53 is attracted to the upper stay 72, and the north-pole portion 70a to the lower stay 72. As a result, the valve disk 53 rotates counterclockwise.

When the valve disk 53 is rotated for a predetermined angle, the stopper 64 projecting from the lower surface of the valve base 52 abuts against the one end of the through hole 67 of the valve disk 53, as shown in FIG. 8A, whereupon the disk 53 is stopped. As a result, the second connecting port 61 and the low-pressure gas port 60 communicate with each other by means of the depression 66, while the first connecting port 59 opens into the closed casing 25 through the through hole 67.

In this state, the electric motor 27 shown in FIG. 1 is actuated.

When the motor 27 is actuated, the compression mechanism 26 is actuated to compress the sucked low-pressure gas. After the compression, the high-pressure gas is discharged into the closed casing 25 to fill it.

The high-pressure gas filling the closed casing 25 flows into the first connecting port 59 via the through hole 67 in the valve disk 53, and changes its state as it successively passes through the outdoor heat exchanger 62, a decompressor 65 (expansion valve), and indoor heat exchanger 63, thereby cooling the room air.

The gas (low-pressure gas) decompressed to the low pressure level by passing through the indoor heat exchanger 63 flows into the second connecting port 61, and then into the low-pressure gas port 60 through the depression 66 in the valve disk 53. Thereafter, the low-pressure gas is delivered from the port 60 into the compression mechanism 26 in the casing 25 through the intake pipes 45.

The low-pressure gas introduced into the compression mechanism 26 is compressed again into a high-pressure gas by this mechanism 26, and is then discharged into the casing 25. Then, the high-pressure gas is introduced again into the outdoor heat exchanger 62 via the through hole 67 of the selector valve section 28 and the first connecting port 59, and circulates in the pipes of the air conditioner.

In the meantime, the control circuit 108 is controlled in the manner shown in the waveform diagram of FIGS. 9B and 9C. More specifically, the applied voltage is adjusted to zero, so that the pair of stays 72 are not magnetized.

Since the stays 72 are made of iron (magnetic material), even in this case, the state of FIG. 8A can be maintained by means of a force of attraction produced between the stays 72 and the magnet member 54 (FIG. 9A). Since the pressure in the depression 66 is lower than the pressure in the casing 25, moreover, the valve disk 53 and the valve base 52 are brought into airtight contact with each other by means of the internal pressure of the casing 25, and cannot be easily moved.

In suspending the air cooling operation, on the other hand, the electric motor 27 is stopped. Thereupon, the pressure in the casing 25 is lowered, so that the valve disk 53 and the valve base 52 are released from the airtight contact. Moreover, the spring 78 is slightly compressed by the weight of the disk 53, so that a minute gap is formed between the disk 53 and the base 52. In this manner, the pressures in the first and second connecting ports 59 and 61 and the low-pressure gas port 60 are balanced.

Thus, the drive of the valve disk 53 for a change of operation mode over to heating operation can be carried out easily and quickly with low torque.

The following is a description of control and operation for the heating operation.

In the heating operation, the voltage applied to the electromagnet 74 of the magnetism switching unit 55 is controlled in the manner shown in the waveform diagram of 10B and 10C. As a result, in contrast with the case shown in FIG. 8A, the upper stay 72 is magnetized into a south pole, and the lower stay 72 into a north pole.

Accordingly, the north-pole portion 70a of the magnet member 54 fixed to the valve disk 53 is attracted to the upper stay 72, and the south-pole portion 70b to the lower stay 72. As a result, the valve disk 53 rotates clockwise.

When the valve disk 53 is rotated for a predetermined angle (90°), the stopper 64 projecting from the lower surface of the valve base 52 abuts against the other end of the through hole 67 of the valve disk 53, as shown in FIG. 10A, whereupon the disk 53 is stopped from rotating.

As a result, in contrast with the case of the air cooling operation, the first connecting port 59 and the low-pressure gas discharge port 60 communicate with each other by means of the depression 66, while the second connecting port 61 opens into the closed casing 25 through the through hole 67.

When the operation of the electric motor 27 is started in this state, the compression mechanism 26 is actuated to fill the casing 25 with the high-pressure gas, whereby the valve disk 53 is brought intimately into contact with the lower surface of the valve base 52.

The high-pressure gas in the casing 25 changes its state as it successively passes through the second connecting port 61, indoor heat exchanger 63, expansion valve 65 (decompressor), and outdoor heat exchanger 62, thereby heating the room air.

The gas (low-pressure gas) decompressed to the low pressure level by passing through the outdoor heat exchanger 62 flows into the first connecting port 59, and then into the low-pressure gas port 60 through the depression 66. Thereafter, the low-pressure gas is delivered from the port 60 into the compression mechanism 26 in the casing 25 through the intake pipes 45.

During this heating operation, as in the air cooling operation, the voltage applied to the electromagnet 74 is adjusted to zero (FIGS. 11B and 11C). Since the stays 72 are made of iron (magnetic material), even in this case, the state of FIG. 10A can be maintained by a force of attraction produced between the stays 72 and the magnet member 54. Since the pressure in the depression 66 is lower than the pressure in the casing 25, moreover, the valve disk 53 and the valve base 52 are brought into airtight contact with each other by means of the internal pressure of the casing 25, and cannot be easily moved.

The fluid compressor according to the first embodiment described above has the following effects.

First, the pipe arrangement of the air conditioner can be simplified.

Since the through hole 67 in the valve disk 53 opens into the casing 25, no pipes for high-pressure gas are needed. It is unnecessary, therefore, to provide vibration-damping means which is required by conventional high-pressure gas piping.

Since the magnetism switching unit 55, unlike the conventional one, includes no reciprocating slide valve, moreover, it requires no use of a solenoid valve for actuation. Thus, it is unnecessary to use capillary tubes (small-diameter copper tubes) which are required by the conventional selector valve.

In this manner, the pipe arrangement of the air conditioner can be simplified. Since the pipes used in the system are fewer, moreover, the manufacture of the air conditioner, having the selector valve section 28 built in, is so much easier, and the fluid compressor is subject to less vibration.

Since this fluid compressor does not require use of the capillary tubes, furthermore, it is unnecessary to consider any trouble which may be caused by deformation of the capillary tubes, so that a high-reliability fluid compressor can be obtained.

Secondly, the fluid compressor can be reduced in size.

The selector valve section 28 contained in the casing 25 of the compressor, unlike the conventional four-way selector valve, is of a type such that the valve disk 53 is rotatable, and includes no solenoid valve for actuation. Thus, the overall length of the section 28 can be reduced.

When the operation of the compressor is stopped, the valve disk 53 is slightly lowered by gravity, so that it is released from the intimate contact with the valve base 52, and can be rotated with low torque.

Conventionally, in this connection, the slide valve is always in intimate contact with a valve seat, and requires a substantial driving torque. In order to generate a great driving torque, therefore, the solenoid valve must inevitably be made somewhat bulky.

According to the present invention, as described above, the valve disk 53 can be driven with low torque, so that the magnetism switching unit 55 can be made so much smaller in size.

Thus, the selector valve section 28 can be incorporated in the casing 25 of the compressor without increasing the size of the casing 25, so that the recent tendency toward the miniaturization of compressors can be tackled satisfactorily.

Accordingly, the overall length of the junction between the through hole of the cover portion 25a of the casing 25 and the valve base 52 can be shortened, so that welding areas are reduced, and the reliability against gas leakage and the efficiency of welding operation are improved.

Thirdly, gas balancing can be achieved easily and quickly when the compressor is nonoperating.

In the case of the four-way selector valve which includes a reciprocating slide valve, the slide valve must always be intimately in contact with the valve seat in order to prevent a gas leak from between the slide valve and the valve seat.

Even when the fluid compressor is nonoperating, therefore, gas balancing cannot be effected in the region of the selector valve, and achievement of gas balancing in the region of the compression mechanism or the decompressor must be awaited for a long time.

According to the present invention, however, the valve disk 53 is slightly lowered by gravity so that the gap between the disk 53 and the valve base 52 is enlarged when the operation of the compressor is stopped. Thus, all the ports 59 to 61 of the valve base 52 communicate with one another by means of the gap between the base 52 and the upper surface of the valve disk 53, so that gas balancing can be carried out quickly.

When the compressor is operating, moreover, the valve disk 53 is pressed tight against the valve base 52, so that there is no possibility of a gas leak from between the disk 53 and the base 52. The valve disk 53 is kept from easily moving in the rotating direction.

Thus, the gas balancing after the suspension of the operation can be effected easily and quickly, restart of the operation after the suspension and the change of the operation mode between air cooling and heating can be achieved without delay, and injection of the refrigerant and the like can be carried out rapidly without waiting for the achievement of the gas balancing for a long time.

Fourthly, the selector valve section 28 can be controlled with less power.

Since the stays 72 are made of iron, the shift position can be maintained by means of the force of attraction between the stays 72 and the magnet member 54 without magnetizing the stays 72 except when the valve disk 53 is actuated (FIGS. 9A and 11A).

In contrast with the conventional case where the position of the slide valve is maintained by means of a spring and an electromagnet, therefore, voltage need not be applied to the magnetism switching unit 55 during the operation, so that the power consumption can be reduced.

Fifthly, the temperature in the casing 25 is detected by means of the casing temperature sensor unit 113 in accordance with the resistance of the lead wire 75 wound on the electromagnet 74 of the magnetism switching unit 55, so that wiring for exclusive use is unnecessary.

On the other hand, the enclosed terminals 91a, 91b and the selector valve section 28 are provided integrally on the cover portion 25a, and the terminals 91a, 91b are wired to the electric motor 27 and the valve section 28 by means of the first and second connectors 100 and 101 when the cover portion 25a is mounted.

By doing this, the wire arrangement can be simplified, and the sealing performance and assembling efficiency of the casing 25 can be improved.

Sixthly, it is possible to reduce noises which are produced when an HFC (Hydrofluorocarbons)-refrigerant as a flon-replacing refrigerant.

The HFC (Hydrofluorocarbons)-refrigerant is liable to propagate sounds. According to the present invention, however, the selector valve section 28 is of a rotary type such that production of impact sounds which may be caused by switching operation in the case of the reciprocating type can be reduced.

Since the selector valve section 28 is contained in the casing 25, moreover, noises, if any, can be effectively prevented from leaking to the outside by the muffler effect of the casing 25 (having a large capacity and cut off from the outside). Thus, a remarkable effect can be produced especially when the refrigerant used is the HFC (Hydrofluorocarbons)-refrigerant which substitutes flon.

The following is a description of a second embodiment.

Figure 12:
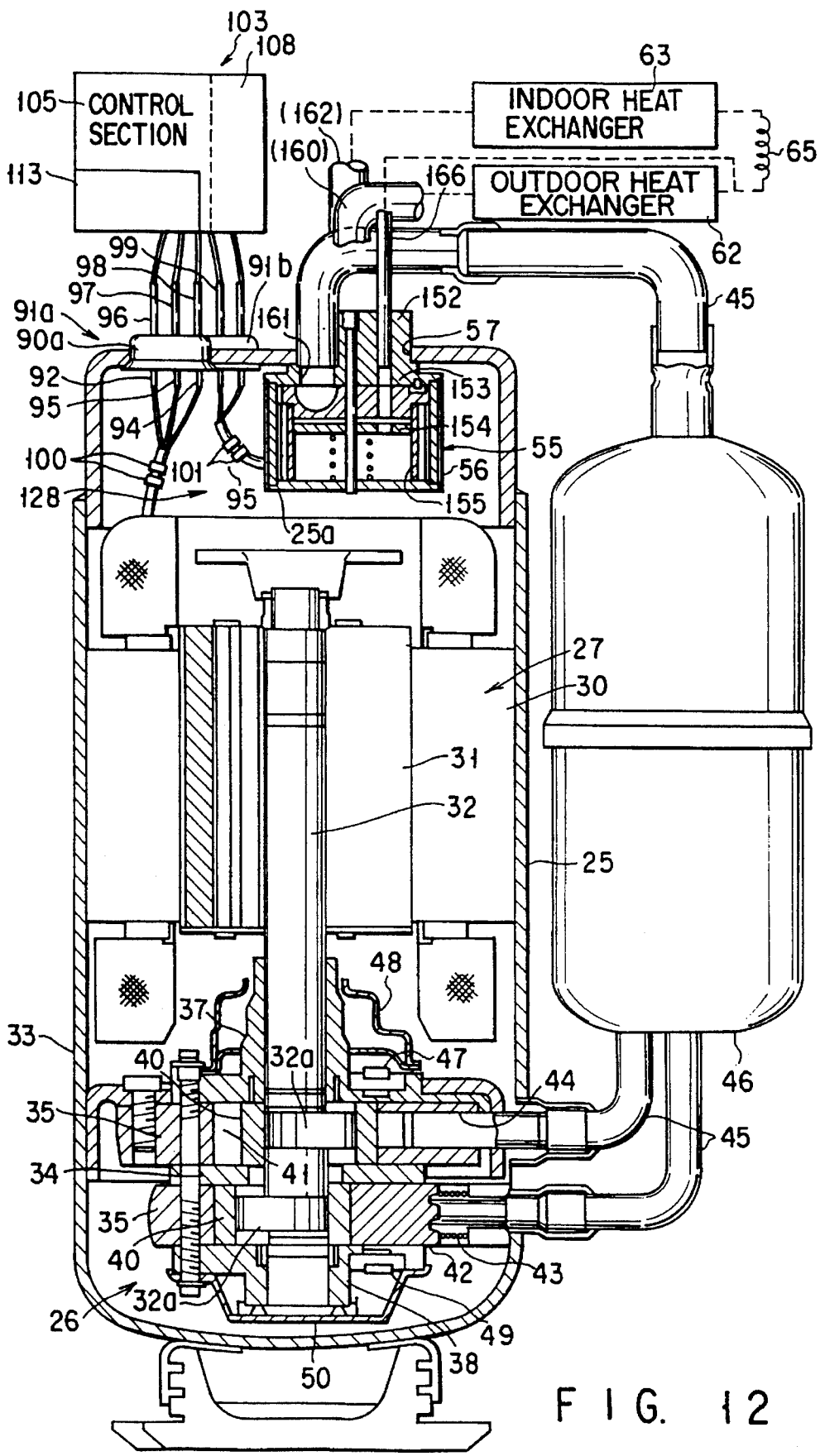
FIG. 12 is a longitudinal sectional view showing a fluid compressor according to a second embodiment of the invention.

FIG. 12 is a longitudinal sectional view showing an outline of a fluid compressor according to the second embodiment.

The fluid compressor of the second embodiment shares some common components with the fluid compressor of the first embodiment. Like reference numerals are used to designate the common or same components, and a detailed description of those components will be omitted to avoid repetition.

The fluid compressor of the second embodiment comprises a closed casing 25. Arranged in the casing 25, as in the first embodiment, are a compression mechanism 26 at the lower end portion thereof with respect to the height direction and an electric motor 27 (brushless DC motor) at the middle portion.

The fluid compressor of the second embodiment, however, comprises a selector valve section 128 at the upper end portion of the closed casing 25, the section 128 having a construction different from that of the selector valve section 28 of the first embodiment. Referring now to FIGS. 12 to 22, the construction of the selector valve section 128 will be described.

Figure 13A:
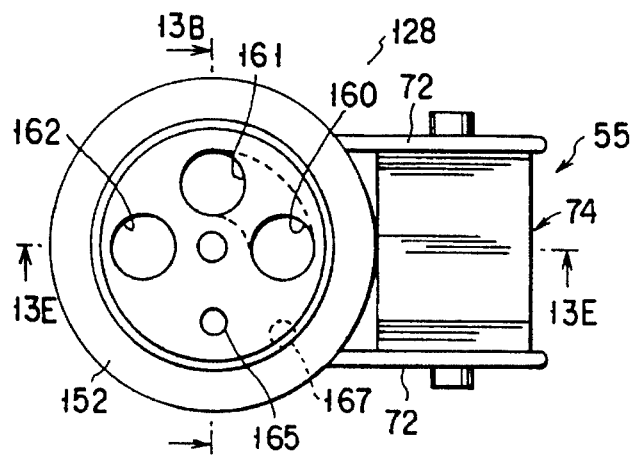
FIG. 13A is a plan view of a selector valve section.
Figure 13B:
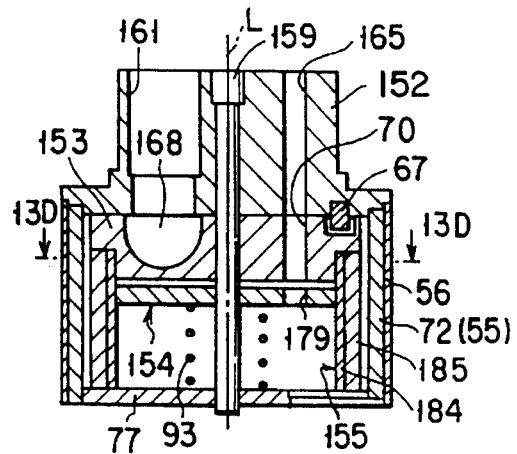
FIG. 13B is a longitudinal sectional view of the selector valve section taken along line 13B—13B of FIG. 13A.
Figure 13C:
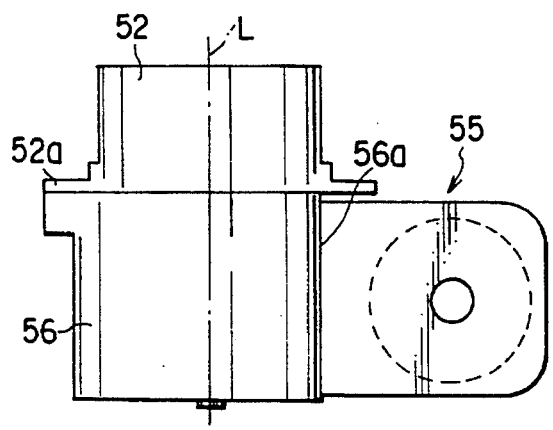
FIG. 13C is a front view of the selector valve section.
Figure 13D:
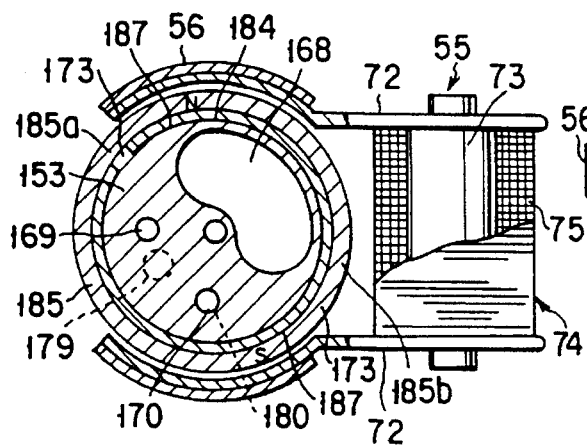
FIG. 13D is a cross-sectional view of the selector valve section taken along line 13D—13D of FIG. 13B.

As shown in FIGS. 12 and 13B, the selector valve section 128 includes a valve base 152, first valve disk 153, second valve disk 154, magnet member 155, magnetism switching unit 55 (same as the one according to first embodiment), and holder 56. The valve base 152 is fixed to closed casing 25. The first valve disk 153 is rotatably attached to the lower surface of the base 152, and serves to change the passage for the working fluid. Likewise, the second valve disk 154 is rotatably attached to the lower surface of the first valve disk 153. The magnet member 155 is fitted on the respective outer peripheral surfaces of the first and second valve disks 153 and 154. The magnetism switching unit 55 applies a magnetic force to the magnet member 155, thereby rotating the first and second valve disks 153 and 154 to change the passage. The holder 56 covers the valve 128.

The valve base 152 is circular in plane shape, as shown in FIGS. 14A to 14C, and has a collar portion 152a on its lower end portion, which is larger in diameter than the upper end portion of the base 152. As shown in FIG. 12, moreover, the valve base 152 is mounted on a cover portion 25a which closes the upper end of the closed casing 25.

A through hole 57 is bored through the top wall of the cover portion 25a, as shown in FIG. 12. The valve base 152 is attached to the cover portion 25a in a manner such that its upper end portion is fitted in the through hole 57, and is fixed by, e.g., welding so as to close the hole 57 airtightly.

As shown in FIGS. 14A to 14C, moreover, the upper end portion of a center shaft 159 is fixed to the valve base 152. The shaft 159 extends along the central axis L of the base 152, and its lower end portion projects into the casing 25. Also, the valve base 152 has three ports 160, 160 and 162 which are arranged circumferentially at intervals of 90° around the shaft 159 and axially penetrate the base 152.

The central port 161, among these three ports 160 to 162, is connected to intake pipes 45 extending from the compression mechanism 26, as shown in FIG. 1, and serves as a low-pressure gas port. The two other ports 160 and 162, having the low-pressure gas port 161 between them, serve as first and second connecting ports which are connected to out- and indoor heat exchangers 62 and 63, respectively, as shown in FIG. 12.

As shown in FIGS. 14A and 14C, moreover, a bypass port 165, which is smaller in diameter than the other ports 160 to 162, axially penetrates that portion of the valve base 152 which is situated at a circumferential distance of 180° from the low-pressure gas port 161.

The bypass port 165 is connected with a bypass pipe 166 shown in FIG. 12, which is connected to piping between the outdoor heat exchanger 62 and a decompressor 65.

As shown in FIGS. 14B and 14C, moreover, a stopper 167 (indicated by crosshatching) protrudes from the lower surface of the collar portion 152a of the valve base 152. As shown in FIG. 13B, the stopper 167 is mounted in a manner such that its upper end portion is screwed in the valve base 152.

The first valve disk 153 is attached to the lower surface of the valve base 152 formed in this manner, as shown in FIG. 13B. The first disk 153 is mounted for rotation relative to the valve base 152 in a manner such that the center shaft 159 projecting from the base 152 is passed through a center hole 153a in the center of the disk 153, whereby the upper surface of the disk 153 is in contact with the lower surface of the base 152.

As shown in FIG. 15A, a depression 168 is formed in the upper surface of the first valve disk 153 so as to extend in the circumferential direction thereof. The depression 168 allows each two adjacent ports (160 and 161 or 161 and 162) spaced at a distance of 90°, among the three ports 160 to 162 of the valve base 152, to communicate alternatively with each other.

As shown in FIG. 15B, the depression 168 is a passage which has an inner surface with a semicircular profile. When the first valve disk 153 is rotated through 90°, each two adjacent ports, that is, the low-pressure gas port 161 (indicated by broken line in FIG. 20A) and the first connecting port 160 (indicated by broken line) or the port 161 and the second connecting port 162 (indicated by broken line in FIG. 22A), are allowed alternatively to communicate with each other, as shown in FIG. 20A or 22A.

Further, the first valve disk 153 is penetrated axially by first and second through holes 169 and 170, which are spaced circumferentially at a distance of 90°. The diameter of the holes 169 and 170 is smaller than the width of the depression 168.

As the first valve disk 153 is rotated within a range of 90° around the center hole 153a, the first and second through holes 169 and 170 communicate with the first or second connecting port 160 or 162 (indicated by broken line) or the bypass port 165 (indicated by broken line), as shown in FIG. 20A, 21A or 22A.

A guide groove 172 is formed on the outer edge portion of the upper surface of the first valve disk 153 with respect to the diametrical direction as shown in FIGS. 15A, 15B. When the first disk 153 is attached to the valve base 152, the stopper 167 protruding from the lower surface of the base 152 is inserted in the groove 172 as shown in FIG. 13B.

The guide groove 172 extends circumferentially throughout a range of 90°. When the first valve disk 153 is rotated, one or the other end of the groove 172 abuts against the stopper 167 so that the range of rotation of the disk 153 is restricted to 90°, as shown in FIG. 20A, 21A or 22A.

Thus, the stopper 167 and the guide groove 172 constitute first restricting means according to the present invention.

As shown in FIG. 15A, sealing members 168a, 169a and 170a are formed integrally on the upper surface of the first valve disk 153 so as to seal joint portions between the disk 153 and the valve base 152 in an airtight manner. The members 168a, 169a and 170a are arranged around the depression 168, first through hole 169, and second through hole 170, respectively. A sealing member 172a formed around the guide groove 172 serves to maintain the gap between the valve base 152 and the first valve disk 153.

The depression 168 and the first and second through holes 169 and 170 are relatively positioned so that when the second connecting port 162 communicates with the first through hole 169, as shown in FIG. 20A, the first connecting port 160 and the low-pressure gas port 161 communicate with each other by means of the depression 168, and the bypass port 165 communicates with the second through hole 170.

When the first connecting port 160 communicates with the second through hole 170, as shown in FIG. 22A, the second connecting port 162 and the low-pressure gas port 161 communicate with each other by means of the depression 168, and the bypass port 165 communicates with the first through hole 169.

Unless closed by the second valve disk 154, the first and second through holes 169 and 170 open into the casing 25.

As shown in FIGS. 15B and 15C, the upper end portion of the first valve disk 153 forms a collar or flange portion 153b which projects slightly outward in the diametrical direction of the disk 153. Two first projections 173 for positioning, which are adapted to engage the magnet member 155, protrude diametrically outward from predetermined positions on the lower end side of the flange portion 153b with respect to the circumferential direction. The projections 173 are spaced circumferentially at a distance of 180°.

The following is a description of the second valve disk 154 which is attached to the lower surface of the first valve disk 153.

Figure 16A:
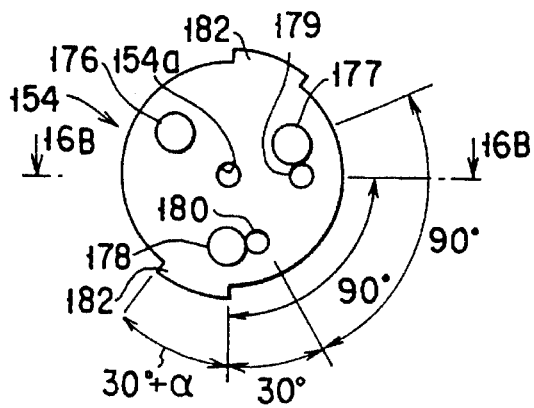
FIG. 16A is a top view of a second valve disk.
Figure 16B:
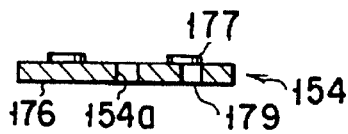
FIG. 16B is a longitudinal sectional view of the second valve disk taken along line 16B—16B of FIG. 16A.
Figure 16C:
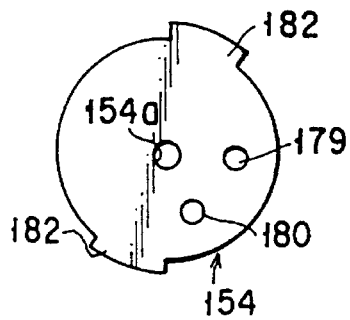
FIG. 16C is a bottom view of the second valve disk.

The second valve disk 154, which is constructed in the manner shown in FIGS. 16A, 16B and 16C, is mounted for rotation relative to the valve base 152 and the first valve disk 153 in a manner such that the center shaft 159 projecting from the base 152 and penetrating the first disk 153 is passed through a center hole 154a in the center of the second disk 154, whereby the upper surface of the second disk 154 is opposed to the lower surface of the first disk 153 (FIG. 13B).

First, second, and third circular sealing members 176, 177 and 178 (FIG. 16A) are formed integrally on the upper surface of the second valve disk 154 so as to be arranged at intervals of 120° around the center hole 154a.

The first to third sealing members 176 to 178 are larger in diameter than the first and second through holes 169 and 170 of the first valve disk 153, and can close these holes as required.

Between the second and third sealing members 177 and 178, as shown in FIGS. 16A to 16c, first and second apertures 179 and 180, which axially penetrate the second valve disk 154, are located on the circumference of the same circle on which the member 177 and 178 are arranged.

The first and second apertures 179 and 180 have a diameter substantially equal to that of the first and second through holes 169 and 170 in the lower surface of the first valve disk 153. When opposed to the apertures 179 and 180, respectively, the through holes 169 and 170 open into the casing 25.

As shown in FIG. 16A, moreover, the third sealing member 178 and the first aperture 179 are relatively positioned so that they form an angle of 90° around the center hole 154a. The first sealing member 177 and the second aperture 180 are relatively positioned in like manner.

Thus, when the second aperture 180 of the second valve disk 154 is opposed to the first through hole 169 of the first valve disk 153, as shown in FIG. 20B, the second sealing member 177 on the second disk 154 closes the second through hole 170 in the first disk 153.

When the first aperture 179 of the second valve disk 154 is opposed to the second through hole 170 of the second valve disk 154, as shown in FIG. 21B, moreover, the third sealing member 178 on the second disk 154 closes the first through hole 169 in the first disk 153.

Two second projections 182 (FIGS. 16A and 16C) protrude diametrically outward from the outer peripheral surface of the second valve disk 154. The projections 182 are adapted to engage slits 187 in the magnet member 155 (mentioned later) and connect the second disk 154 and the member 155 so that they cannot rotate relatively to each other.

The second projections 182, each having a width covering an angle of (30°+α) in the circumferential direction (a corresponds to the width of each first projection 173), protrude individually from two positions at a distance of 180° in the circumferential direction from each other.

As shown in FIG. 13B, moreover, the magnet member 155 is mounted on the respective outer peripheral surfaces of the first and second valve disks 153 and 154.

Figure 17A:
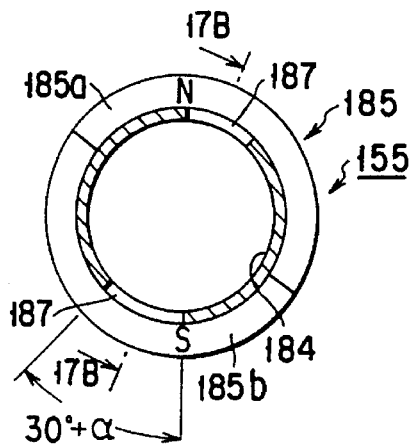
FIG. 17A is a top view of a magnet member.
Figure 17B:
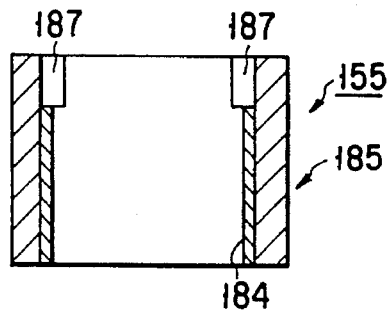
FIG. 17B is a longitudinal sectional view of the magnet member taken along line 17B—17B of FIG. 17A.

As shown in FIGS. 13B, 17A and 17B, the magnet member 155 is composed of a thin-walled cylindrical collar 184, fitted directly on the first and second valve disks 153 and 154, and a permanent magnet 185 fixed to the outer surface of the collar 184.

As shown in FIGS. 17A and 17B, the slits 187 are provided at the upper end portion of the collar 184. The slits 187, each having a width covering an angle of (30°+α) (equivalent to the width of each second projection 182) in the circumferential direction, are arranged at a distance of 180° in the circumferential direction of the collar 184 from each other.

The first and second valve disks 153 and 154 are combined with the magnet member 155 in a manner such that the first and second projections 173 and 182 protruding from their respective outer peripheral surfaces are situated in their corresponding slits 187.

Figure 18:
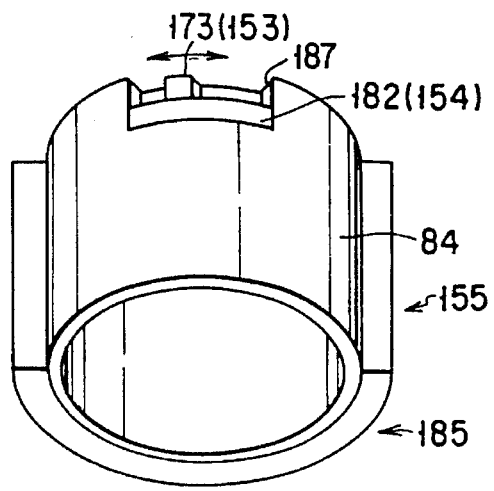
FIG. 18 is a perspective view, partially omitted, showing an assembly combining the first and second valve disks and the magnet member.

Accordingly, the second valve disk 154 and the magnet member 155 cannot rotate relatively to each other, while the first valve disk 153 can rotate relatively to the member 155 within a range of 30° in the circumferential direction, as indicated by the arrow in FIG. 18.

Thus, the first and second projections 173 and 182 and the slits 187 constitute second restricting means according to the present invention.

The permanent magnet 185, fixed to the outer peripheral surface of the collar 184, is divided diametrically into two parts, a north-pole portion 185a and a south-pole portion 185b, and is driven by means of a magnetic force from the magnetism switching unit 55.

Since the magnetism switching unit 55 is constructed in the same manner as the one according to the first embodiment (FIGS. 4A to 4C), a description of this unit will be omitted to avoid repetition.

In operating the compressor, the first valve disk 153 is pressed against the valve base 152 by means of a difference in pressure between a low-pressure gas in the depression 168 in the disk 153 and a high-pressure gas in the casing 25.

The driving torque of the magnetism switching unit 55 which acts on the magnet member 155 is adjusted so as to be smaller than a static frictional force F1 produced between the first valve disk 153 and the valve base 152 during the operation.

However, the driving torque of the magnetism switching unit 55 is set so as to be greater than a static frictional force F2 (F2<F1) produced between the first and second valve disks 153 and 154 during the operation.

Accordingly, the magnetism switching unit 55 can drive only the second valve disk 154 during heating or air cooling operation. After the operation is stopped, the unit 55 can drive both the first and second valve disks 153 and 154.

As shown in FIGS. 13B to 13E, a holder 56 is located outside the distal end portions of stays 72.

Since the holder 56 is constructed in the same manner as the one according to the first embodiment, a description of this holder will be omitted to avoid repetition.

Figure 13E:
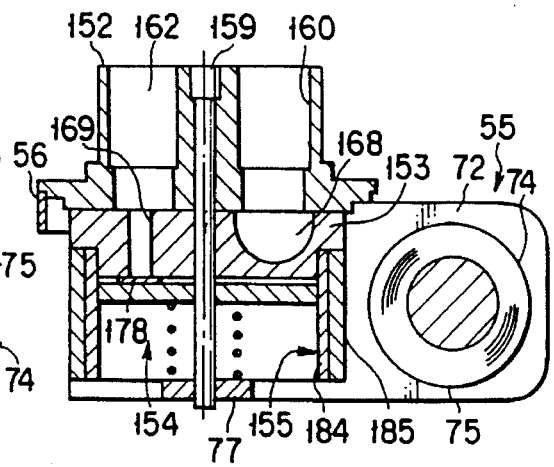
FIG. 13E is a longitudinal sectional view of the selector valve section taken along line 13E—13E of FIG. 13A.

As shown in FIGS. 13B and 13E, moreover, a backup member 77 is fixed to the lower end of the center shaft 159, which protrudes from the valve base 152 and extends downward through the first and second valve disks 153 and 154. The member 77 is also constructed in the same manner as the one according to the first embodiment.

As shown in FIGS. 13B and 13E, furthermore, a spring 193 is interposed axially compressed between the central portion of the backup member 77 and the lower surface of the second valve disk 154, whereby the first and second valve disks 153 and 154 are pressed toward the lower surface of the valve base 152.

The urging force of the spring 193 is adjusted to a level such that a minute gap is allowed to be formed between the upper surface of the first valve disk 153 and the lower surface of the valve base 152 by the weights of the first and second valve disks 153 and 154 when the compressor is nonoperating, that is, when the selector valve section 128 is not affected by the difference in pressure between the high- and low-pressure gases.

The following is a description of the way of assembling the selector valve section 128.

First, the holder 56 is fixed to the valve base 152. As shown in FIG. 18, on the other hand, the first and second valve disks 153 and 154 and the magnet member 155 are kept combined with one another in a manner such that the first and second projections 173 and 182 of the disks 153 and 154 are inserted in the slits 187 in the collar 184 of the magnet member 155.

In this state, a gap corresponding to the thickness of the first to third sealing members 176 to 178 is defined between the lower surface of the first valve disk 153 and the upper surface of the second valve disk 154, as shown in FIG. 13E.

Then, the upper end portion of the valve base 152 is inserted into the through hole 57 in the cover portion 25a of the closed case 25, and is welded to be fixed.

Thereafter, the combination of the first and second valve disks 153 and 154 and the magnet member 155 is mounted on the center shaft 159 of the valve base 152, and the magnetism switching unit 55 is attached. Finally, the backup member 77 is fixed to the respective lower ends of the shaft 159 and the holder 157 in a manner such that the spring 193 is compressed thereby.

Figure 19:
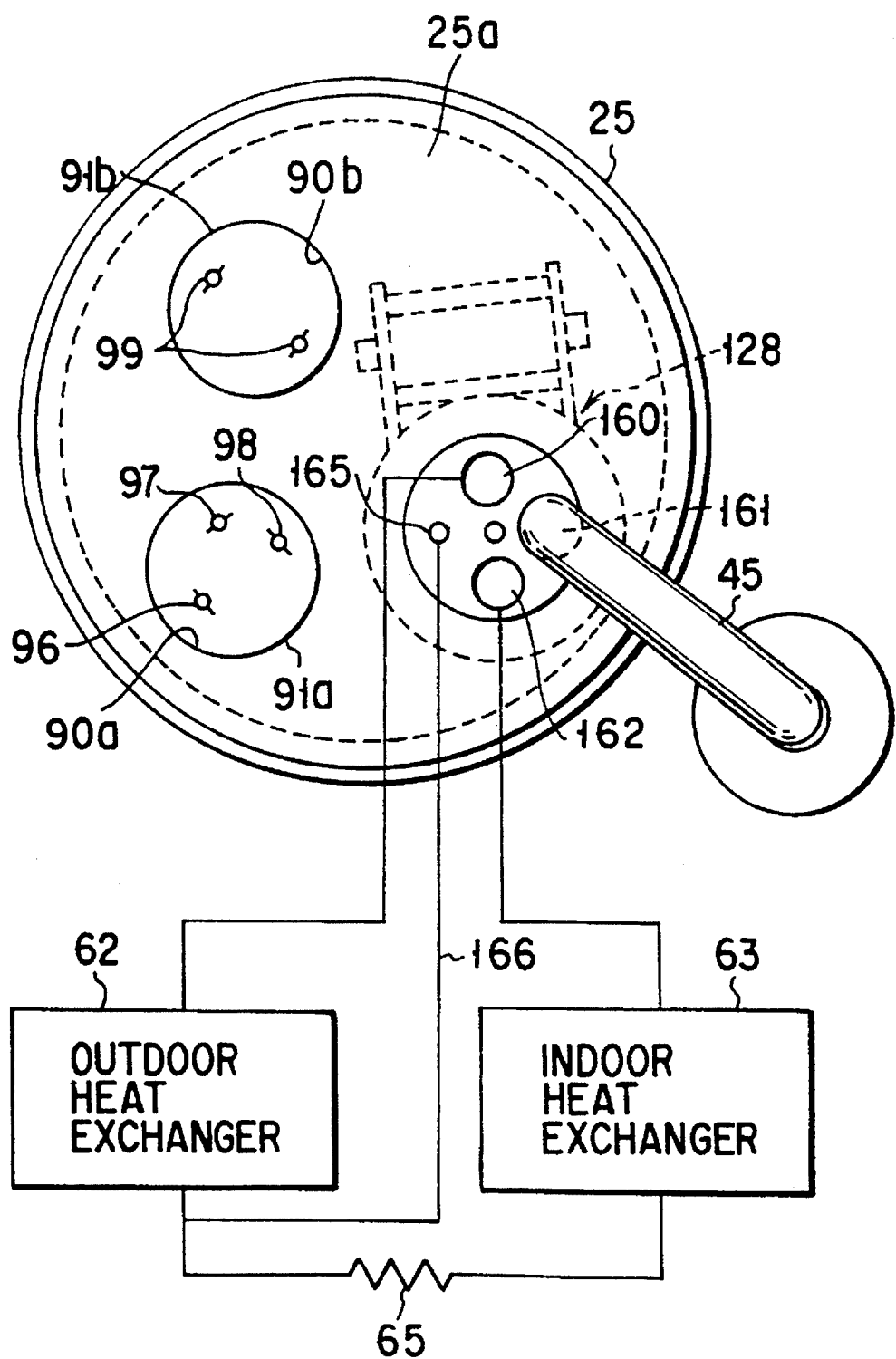
FIG. 19 is a top view of the fluid compressor.

As shown in FIGS. 12 and 19, on the other hand, second and third through holes 90a and 90b are formed in the cover portion 25a so as to be situated beside the selector valve section 128. First and second enclosed terminals 91a and 91b are fitted in the through holes 90a and 90b, respectively, so as to close them airtightly.

Since the construction of the first and second enclosed terminals 91a and 91b and the wire connection between the electric motor 27 and the selector valve section 128 are the same as the ones according to the first embodiment, a description of them will be omitted to avoid repetition.

Thus, in assembling the compressor, the selector valve section 128 and the first and second enclosed terminals 91a and 91b are mounted on the cover portion 25a, and a second connector 101 extending from a pair of inside terminals 95 of the second enclosed terminal 91b and a second connector 101 from the valve section 128 are connected to each other.

Then, in attaching the cover portion 25a to the casing 25, a first connector 100 extending from first to third inside terminals 92 to 94 of the first enclosed terminal 91a and a first connector 100 from the electric motor 27 are connected to each other.

Finally, the cover portion 25a, fitted with these components, is fixed and welded to the casing 25, and the casing 25 is closed airtightly. Thereupon, the fluid compressor is completed.

On the other hand, outside terminals 96 to 99 of the enclosed terminals 91a and 91b, like the ones according to the first embodiment, are connected to a control section 103. This control section comprises an inverter circuit 105 for controlling the compression mechanism 26, a control circuit 108 for controlling the selector valve section 128, and a temperature sensor unit 113 for detecting the temperature in the casing 25.

The respective constructions and functions of the inverter circuit 105, control circuit 108, and temperature sensor unit 113 are the same as the ones according to the first embodiment, a description of them will be omitted to avoid repetition.

The following is a description of the control (operation) of an air conditioner which is furnished with the compressor described above.

A stop mode will be described first.

In the stop mode, the first and second valve disks 153 and 154 are slightly lowered by gravity, resisting the urging force of the spring 193, so that the upper surface of the first valve disk 153 is separated a little from the lower surface of the valve base 152.

In this case, the first and second connecting ports 160 and 162, low-pressure gas port 161, and bypass port 165 all communicate with one another by means of the gap between the first valve disk 153 and the valve base 152. The pressure in the piping of the air conditioner is balanced.

Referring now to FIGS. 20A to 20F, control for heating operation will be described.

In the heating operation, the voltage applied to the electromagnet 74 of the magnetism switching unit 55 is controlled by means of the control circuit 108, as shown in the waveform diagram of FIGS. 20C and 20D. As a result, the stay 72 (magnetic piece) on the upper side is magnetized into a south pole, and the lower stay 72 into a north pole.

Accordingly, the north-pole portion 185a of the permanent magnet 185 is attracted to the upper stay 72, and the south-pole portion 185b to the lower stay 72. As a result, the permanent magnet 185 (magnet member 155) rotates clockwise.

As mentioned before, the second valve disk 154 is combined with the magnet member 155 so that they cannot rotate relatively to each other. Moreover, the first valve disk 153 is supported by means of the second disk 154. Accordingly, the first and second disks 153 and 154 rotate together with the magnet member 155.

When the stopper 167 projecting downward from the lower surface of the valve base 152 abuts against the one circumferential end of the guide groove 172 of the first valve disk 153, as shown in FIG. 20A, only the first disk 153 stops rotating.

As a result, the first connecting port 160 and the low-pressure gas port 161 communicate with each other by means of the depression 168 in the first valve disk 153, as shown in FIG. 20A. Also, the second connecting port 162 faces the first through hole 169 in the first disk 153, while the bypass port 165 faces the second through hole 170.

When each of the first projections 173 of the first valve disk 153 abuts against one circumferential end of its corresponding slit 187 in the collar 184 of the magnet member 155, as shown in FIG. 20B, moreover, the member 155 and the second valve disk 154 stop rotating.

Thereupon, the second through hole 170, opening in the first valve disk 153, is closed by the second sealing member 177 on the second valve disk 154, as shown in FIG. 20B.

On the other hand, the first through hole 169 of the first valve disk 153 faces the second aperture 180 of the second valve disk 154. Thereupon, only the second connecting port 162, which faces the first through hole 169, opens into the casing 25.

In this state, the electric motor 27 shown in FIG. 12 is actuated.

When the motor 27 is actuated, the compression mechanism 26 is actuated to compress the low-pressure gas sucked through the intake pipes 45. After the compression, as in the case of the first embodiment, the high-pressure gas is discharged into the closed casing 25. The high-pressure gas filling the closed casing 25 flows into the second aperture 180 of the second valve disk 154, and is guided from the gap between the first and second valve disks 153 and 154 (corresponding to the thickness of the sealing members 176 to 178) into the second connecting port 162 via the first through hole 169 of the first disk 153.

The high-pressure gas is discharged to the outside of the casing 25 through the second connecting port 162, and changes its state as it successively passes through the indoor heat exchanger 63, decompressor 65, and outdoor heat exchanger 62, thereby heating the room air (see FIG. 19).

The low-pressure gas, decompressed to the low pressure level by passing through the outdoor heat exchanger 62, flows into the first connecting port 160, and is guided to the low-pressure gas port 161 through the depression 168 in the first valve disk 153, and introduced into the compression mechanism 26 in the casing 25 through the intake pipes 45 of the compressor.

The low-pressure gas introduced into the compression mechanism 26 is compressed again into a high-pressure gas by this mechanism 26, and is then discharged into the casing 25. Then, the high-pressure gas is introduced again into the indoor heat exchanger 63 via the second aperture 180 of the second valve disk 154, first through hole 169 of the first valve disk 153, and the second connecting port 162, and circulates in the pipes of the air conditioner.

In the meantime, the control circuit 108 is controlled in the manner shown in the waveform diagram of FIGS. 20E and 20F. More specifically, the voltage applied to the electromagnet 74 of the magnetism switching unit 55 is adjusted to zero, so that the pair of stays 72 are not magnetized.

Since the stays 72 are made of iron (magnetic material), even in this case, the state shown in FIGS. 20A and 20B can be maintained by means of a force of attraction produced between the stays 72 and the magnet member 155.

During the heating operation, the depression 168 of the first valve disk 153 is filled with the low-pressure gas, so that its internal pressure is lower than that of the casing 25 which is filled with the high-pressure gas. Thus, the first valve disk 153 and the valve base 152 are brought into airtight contact with each other by means of the difference between these pressures, and a static frictional force greater than the driving torque of the magnetism switching unit 55 is produced between the two.

At this time, the second through hole 170 of the first valve disk 153, which communicates with the bypass port 165, is closed by the second sealing member 177 on the second valve disk 154. Accordingly, the fluid never flows into the bypass pipe 166 shown in FIGS. 12 and 19.

In this manner, the air conditioner performs the heating operation. As the operation is continued for a long period of time, refrigerant pipes or radiator fins of the outdoor heat exchanger 62 may be frosted. This frosting lowers the heat exchange efficiency of the exchanger 62 and the performance of the air conditioner. Therefore, the air conditioner requires periodical defrosting operation. The following is a description of the defrosting operation.

The defrosting operation is carried out during the heating operation.

In the state shown in FIGS. 20A, 20B and 20E and 20F, the voltage applied to the electromagnet 74 of the magnetism switching unit 55 is controlled in the manner shown in the waveform diagram of FIGS. 21C and 21D. As a result, the stay 72 on the upper side is magnetized into a north pole, and the lower stay 72 into a south pole, in contrast with the case shown in FIG. 20A.

Thereupon, repulsion is caused between the permanent magnet 185 and the stays 72, so that the magnet member 155 and the second valve disk 154 fixed thereto rotates in the counterclockwise direction indicated by the arrow in FIG. 20B.

At this time, the first valve disk 153 maintains its position for the heating operation, and never rotates. This is because the first valve disk 153 and the valve base 152 are brought intimately into contact with each other, under the static frictional force F1 which is greater than the driving torque of the magnetism switching unit 55, during the heating operation, as mentioned before.

Meanwhile, the first and second valve disks 153 and 154 are not pressed against each other by means of the difference in pressure between the high- and low-pressure gases, and the second disk 154 is pressed against the first disk 153 only by means of the spring 193.

Thus, the static frictional force F2 produced between the first and second valve disks 153 and 154 is much smaller than the static frictional force F1 produced between the first disk 153 and the valve base 152, and is also smaller than the driving torque of the magnetism switching unit 55.

When the voltage is applied to the electromagnet 74 of the magnetism switching unit 55, therefore, only the second valve disk 154 rotates together with the magnet member 155 and independently of the first valve disk 153.

When the magnet member 155 and the second valve disk 154 rotate integrally so that each of the first projections 173 of the first valve disk 153 abuts against the other circumferential end of its corresponding slit 187 in the collar 184 of the member 155, as shown in FIG. 21B, the second disk 154 and the member 155 stop rotating.

As mentioned before, the driving torque of the magnetism switching unit 55 is smaller than the static frictional force F1 produced between the first valve disk 153 and the valve base 152 during the heating operation, so that the second valve disk 154 and the magnet member 155 cannot rotate further.

As shown in FIG. 21B, therefore, the second through hole 170 of the first valve disk 153, which communicates with the bypass port 165, faces the first aperture 179 of the second valve disk 154 and opens into the casing 25. The first through hole 169 of the first disk 153, which communicates with the second connecting port 162, is closed by the third sealing member 178.

Thereupon, the high-temperature, high-pressure gas filling the casing 25 flows into the bypass pipe 166 through the first aperture 179, second through hole 170, and bypass port 165, and is supplied directly to the outdoor heat exchanger 62. Thus, the exchanger 62 is defrosted.

On the other hand, a gap with a predetermined width is defined between the valve base 152 and the first valve disk 153 by the sealing members 168a, 169a, 170a and 172a which are formed integrally on the first disk 153, so that the high-temperature, high-pressure gas in the casing 25 also flows into the second connecting port 162 which communicates with the gap. Thus, the heating operation is continued.

In this manner, the outdoor heat exchanger 62 can be defrosted without interrupting the heating operation.

During the defrosting operation, power supply to the magnetism switching unit 55 is suspended, as shown in the waveform diagram of FIGS. 21E and 21F. Even in this state, the state shown in FIGS. 21A and 21B can be maintained by means of the force of attraction between the stays 72 and the magnet member 155 in the same manner as in the heating operation.

When defrosting the outdoor heat exchanger 62 is finished, the voltage applied to the magnetism switching unit 55 is changed again, as shown in the waveform diagram of FIGS. 20C and 20D, whereupon the original state (FIGS. 20A and 20B) for the heating operation is restored.

In suspending the heating operation, on the other hand, the electric motor 27 is stopped. Thereupon, the pressure in the casing 25 is lowered, so that the first valve disk 153 and the valve base 52 are released from the airtight contact.

Since the weight of the first valve disk 153 acts on the second valve disk 154, moreover, the spring 193 is slightly compressed by the respective weights of the disks 153 and 154, so that a minute gap is formed between the first disk 153 and the valve base 152. In this manner, the pressures in the first and second connecting ports 160 and 162 and the low-pressure gas port 161 are balanced.

Since the gas balancing is thus effected quickly, waiting time for the restart of the air conditioner can be shortened.

The following is a description of control and operation for the air cooling operation.

In the air cooling operation, the voltage applied to the electromagnet 74 of the magnetism switching unit 55 is controlled in the manner shown in the waveform diagram of FIGS. 22C and 22D. As a result, in contrast with the case of the heating operation shown in FIGS. 20A and 20B, the upper stay 72 is magnetized into a north pole, and the lower stay 72 into a south pole.

Accordingly, the south-pole portion 185b of the permanent magnet 185 of the magnet member 155 is attracted to the upper stay 72, and the north-pole portion 185a to the lower stay 72. As a result, the magnet member 155 rotates counterclockwise.

The second valve disk 154 is kept nonrotatable with respect to the magnet member 155, and the first valve disk 153 is in engagement with the slits 187 of the collar 184 of the member 155. Accordingly, the first and second disks 153 and 154 rotate together with the magnet member 155.

Since the electric motor 27 is not actuated yet by this time, the casing 25 is not filled with the high-pressure gas. Accordingly, the first valve disk 153 and the valve base 152 are not in intimate contact with each other, so that no excessive static frictional force is produced. Even though a low torque is applied from the magnetism switching unit 55 to the magnet member 155, therefore, the first valve disk 153 can be easily rotated together with the member 155 and the second valve disk 154.

When the stopper 167 projecting from the valve base 152 abuts against the other circumferential end of the guide groove 172 of the first valve disk 153, as shown in FIG. 22A, the first disk 153 stops rotating.

As a result, the second connecting port 162 and the low-pressure gas port 161 communicate with each other by means of the depression 168, in contrast with the case of the heating operation. Also, the first connecting port 160 faces the second through hole 170 in the first disk 153, while the bypass port 165 faces the first through hole 170.

Meanwhile, the magnet member 155 and the second valve disk 154 further continue to rotate. When each of the first projections 173 of the first valve disk 153 abuts against the other circumferential end of its corresponding slit 187 in the collar 184 of the magnet member 155, as shown in FIG. 22B, the second valve disk 154 and the member 155 stop rotating.

Thereupon, the second through hole 170 of the first valve disk 153, which faces the first connecting port 160, is opposed to the first aperture 179 in the second valve disk 154 and opens into the casing 25.

On the other hand, the first through hole 169 of the first valve disk 153, which faces the bypass port 165, is closed by the third sealing member 178 on the second valve disk 154.

When the operation of the electric motor 27 is started in this state, the compression mechanism 26 is actuated to fill the casing 25 with the high-pressure gas. The first valve disk 153 is brought intimately into contact with the lower surface of the valve base 152 by means of the difference in pressure between the high-pressure gas and the low-pressure gas in the depression 168.

The high-pressure gas in the casing 25 flows into the first aperture 179 of the second valve disk 154, and then into the second through hole 170 of the first valve disk 153 and the first connecting port 160 through the gap defined between the first and second valve disks 153 and 154 by the sealing members 176 to 178.

The high-pressure gas in the casing 25 also flows into the first connecting port 160 through the gap defined between the valve base 152 and the first valve disk 153 by the sealing members 168a, 169a, 170a and 172a of the disk 153.

The high-pressure gas, after passing through the first connecting port 160, changes its state as it successively flows through the outdoor heat exchanger 62, decompressor 65, and indoor heat exchanger 63, thereby cooling the room air.

The gas (low-pressure gas) decompressed to the low pressure level by passing through the indoor heat exchanger 63 flows into the second connecting port 162, and is guided to the low-pressure gas port 161 through the depression 168. After passing through the port 161, the low-pressure gas is introduced into the compression mechanism 26 in the casing 25 through the intake pipes 45.

During the air cooling operation, as in the heating operation, the voltage applied to the electromagnet 74 of the magnetism switching unit 55 is adjusted to zero, as shown in FIGS. 22E and 22F. Since the stays 72 are made of iron (magnetic material), even in this case, the state shown in FIGS. 22A and 22B can be maintained by means of the force of attraction produced between the stays 72 and the magnet member 155.

At this time, moreover, the internal pressure of the depression 168 is lower than that of the casing 25, so that the first valve disk 153 is brought into airtight contact with the valve base 152 by means of the difference between these pressures, and cannot be moved easily.

The above-described arrangement has the following effects.

The fluid compressor of the second embodiment provides an effect that the outdoor heat exchanger 62 can be quickly defrosted by means of a simple arrangement without interrupting the heating operation, besides substantially the same effects as the ones according to the first embodiment.

In defrosting the frosted outdoor heat exchanger according to the conventional arrangement, the heating cycle must be temporarily changed over to the air cooling cycle so that the high-pressure gas in the compressor is delivered to the outdoor heat exchanger.

If this is done, however, the room temperature will inevitably be lowered. According to the conventional arrangement, moreover, the gas balancing cannot be effected with speed, as mentioned before, so that the operation mode cannot be quickly changed. Thus, quick defrosting cannot be effected, and restoration to the normal heating operation after the defrosting operation requires much time.

In order to solve these problems, a method may be proposed such that a selector valve for defrosting operation is provided independently of the four-way selector valve, and a high-temperature, high-pressure gas from the compressor is supplied directly to the frosted outdoor heat exchanger to defrost it by means of the additional selector valve.

According to this method, however, the selector valves are two in number, so that the construction of the compressor is complicated. If these two selector valves are located in the casing, the casing is expected be large-sized, and the number of wires led out of the casing is increased, thus entailing a complicated wire arrangement.

According to this second embodiment, however, the selector valve section 128, including the first and second valve disks 153 and 154, serves as a rotary five-way selector valve, and is contained in the casing 25.

Thus, there may be provided a compressor in which the defrosting operation can be quickly performed with use of a simple arrangement such that the first and second valve disks 153 and 154 are rotated integrally with or relatively to each other. As described in connection with the first embodiment, moreover, a compact compressor can be obtained which enjoys a simple pipe arrangement and produces less noises.

Instead of using a plurality of drive means, furthermore, the one magnetism switching unit 55 may be used to rotate the first and second valve disks 153 and 154 integrally or relatively.

More specifically, the first and second valve disks 153 and 154 can be driven independently by means of the single magnetism switching unit 55 by utilizing the increase of the static frictional force which is attributable to the intimate contact between the first valve disk 153 and the valve base 152 during the air cooling or heating operation.

Moreover, only two wires for the power supply to the electromagnet 74 of the magnetism switching unit 55 may be connected to the control section 103 for controlling the five-way selector valve, so that the wire arrangement can be also simplified.

At least two electromagnets are needed if the operation is to be switched between the three operation modes, i.e., air cooling, heating, and defrosting, without using the arrangement described above, so that the wire arrangement and construction are complicated.

It is to be understood that the present invention is not limited to the first and second embodiments described above, and that various changes and modifications may be effected therein by one skilled in the art without departing from the scope or spirit of the invention.

According to the first or second embodiment, for example, the rotatable valve disk 53 or 154, for use as a rotary selector valve, is rotated by magnetism switching by means of the magnetism switching unit 55. Alternatively, however, the valve disk may be rotated by means of any other rotating mechanism.

Instead of using the magnet member 54 or 155, for example, a driven gear may be fixed to the outer peripheral surface of the valve disk 53 or 154, or driven teeth may be formed directly on the valve disk 53 or 154. In this case, the valve disk is driven by means of a servomotor which has a driving gear.

According to the first or second embodiment, moreover, the magnet member 54 or 155 is fixed to the valve disk 53 or 154, which is urged against the valve base 52 or 152 by means of the spring 78 or 193. However, the present invention is not limited to this arrangement.

For example, a retaining member may be provided for retaining the respective lower surfaces of the valve disk 53 or 154 and the magnet member 54 or 155, which are combined without being bonded. In this case, the valve disk and the magnet member are united in a body, and the valve disk 53 or 154 is pressed against the valve base 52 or 152 by urging the retaining member.

Figure 23:
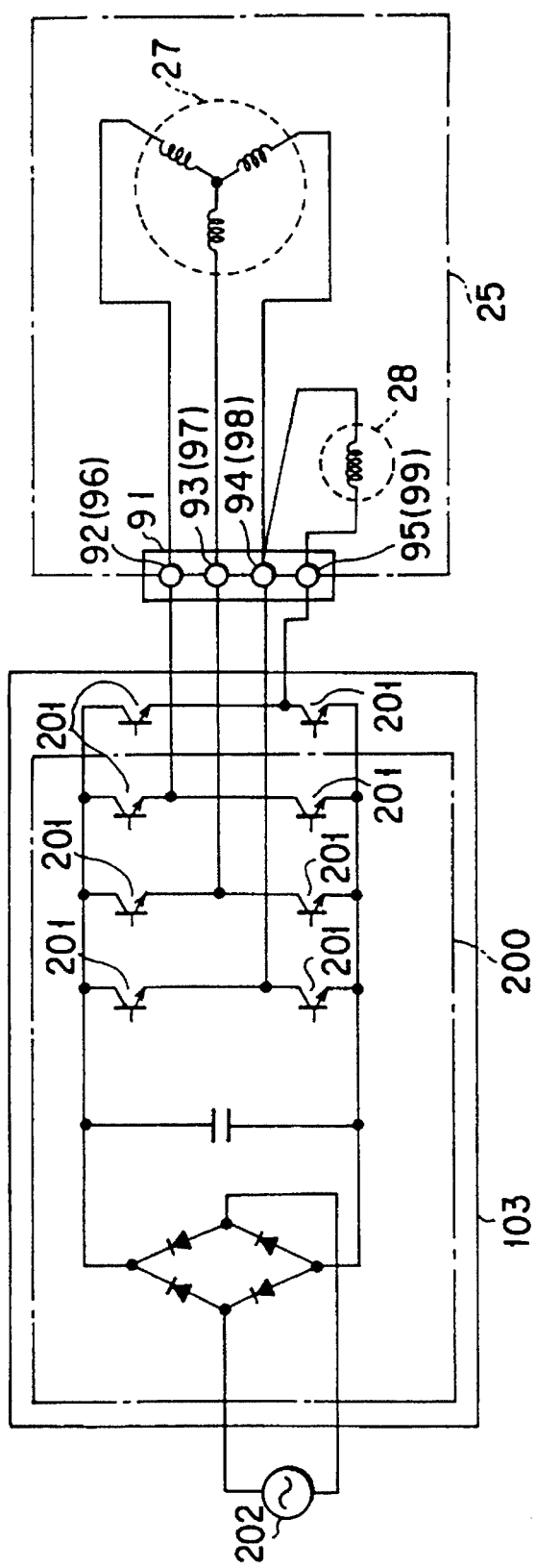
FIG. 23 is a circuit diagram showing a control circuit according to another embodiment.

Moreover, the control circuit 108 for actuating the selector valve section 28 or 128 is not limited to the one shown in FIG. 8A. For example, the selector valve section may be arranged in the manner shown in FIG. 23.

In this circuit, one of terminals (third inside and outside terminals 94 and 98) connected to the electric motor 27 and one of terminals (one of a pair of inside terminals 95 and outside terminals 99) connected to the selector valve section 28 serve as common terminals, and each enclosed terminal 91 includes inside terminals 92 to 95 and outside terminals 96 to 99, four in total number.

Wires led out from the outside terminals 96 to 98 of the enclosed terminal 91 are connected to an inverter circuit 200 for controlling the electric motor 27. Transistors 201 in the circuit 200 are connected to an inverter control section (not shown). Also, the inverter circuit 200 is connected to an AC power source 202.

In this case, the wire arrangement of the compressor can be simplified. Thus, in the case where the selector valve section 28 or 128 is contained in the casing 25 of the compressor, wires for controlling the electric motor 27 and wires for controlling the valve section 28 or 128 may typically be taken out of the casing 25 in a separate manner.

With this arrangement, however, the casing 25 must be provided with a number of through holes through which the wires are taken out. Therefore, the sealing performance of the casing 25 is lowered, and the wiring operation is troublesome.

If the electric motor 27 is a brushless DC motor contained in the casing 25, as in the cases of the foregoing embodiments, it requires at least five wires including three for the electric motor 27 and two for the magnetism switching unit 55 of the selector valve section 28 or 128.

In the arrangement described above, however, the wires for the electric motor 27 and the wires for the selector valve section 28 or 128 are incorporated into the one enclosed terminal 91. Moreover, one of the three terminals for the motor 27 and one of the two terminals for the selector valve section 28 or 128 serve as one terminal for common use, and a control circuit for the four terminals is provided in the control section 103.

Thus, the wire arrangement of the compressor can be simplified, and the sealing performance and assembling efficiency of the casing 25 can be improved.

Figure 24:
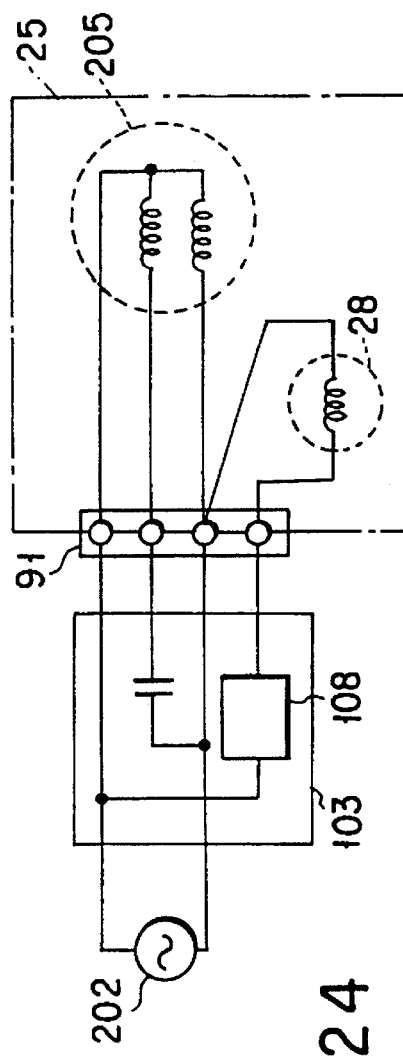
FIG. 24 is a circuit diagram showing a control circuit according to still another embodiment.

Although the brushless DC motor is used as the electric motor 27 according to the foregoing embodiments, moreover, it may be replaced with a single-phase motor 205, as shown in FIG. 24.

In this case, the control circuit used should be the one shown in FIG. 24.

According to the foregoing embodiments, furthermore, the fluid compressor is a two-cylinder fluid compressor which includes the two cylinders 35 and the two rollers 40. Alternatively, however, the compressor may be a one-cylinder rotary compressor which includes only one roller 40, for example.

Alternatively, moreover, the compressor may be a scroll compressor which compresses a fluid in a compression chamber, formed of a combination of rotating and nonrotating scroll blades, by turning the rotating blade with respect to the nonrotating blade. In short, the compressor should only be designed so that the casing 25 can be filled with a compressed high-pressure fluid.

According to the second embodiment, furthermore, the first and second valve disks 153 and 154 are driven by means of the one magnetism switching unit 55. Alternatively, however, the valve disks 153 and 154 may be driven by means of a servomotor and a crank mechanism connected to a reciprocating solenoid valve, respectively, for example.

Also in this case, the drive of the first and second valve disks 153 and 154 does not require any great driving force, as described in connection with the effects of the first embodiment, so that the drive mechanism need not be large-sized. Thus, the fluid compressor can be made compact.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A fluid compressor comprising:

a closed casing;

compression means provided in the casing for compressing an uncompressed low-pressure fluid and discharging a compressed high-pressure fluid into an inside space of the casing; and a selector valve including, a valve base attached to the casing in a manner such that one surface of the valve base is exposed to an outside region of the casing and that an other surface of the valve base is situated in the casing, and having circumferentially arranged three ports penetrating the valve base and opening in the one and the other surface of the valve base, a valve disk rotatably mounted on the valve base in a manner such that one surface of the valve disk faces the other surface of the valve base, and having a communication passage adapted to select two adjacent ports of said three ports in said valve, and to make the selected two ports communicate with each other when the valve disk rotates through a predetermined angle, and a through hole penetrating the valve disk from the one surface thereof to an other surface thereof, whereby a third, non-selected of said ports opens into the casing when the valve disk rotates through a predetermined angle, a pipe for the uncompressed low-pressure fluid, the pipe connecting one of the three ports of the valve base and the compression means so that the uncompressed low-pressure fluid having flowed from the outside region of the casing into the selector valve and passed through the communication passage of the valve disk is introduced into the compression means, and drive means for rotating the valve disk so as to change a high-pressure fluid passage of the compressed high-pressure fluid flowing out from the inside space of the casing to the outside region of the casing and to switch a low-pressure fluid passage of the uncompressed low-pressure fluid flowing from the outside region of the casing into the selector valve to communicate with the compression means.

2. A fluid compressor according to claim 1, wherein said fluid compressor is used in an air conditioner comprising a first outdoor heat exchanger for heat exchange between the circulating high- or low-pressure fluid and the outdoor air, a decompressor for decompressing and expanding the circulating high-pressure fluid, and a second indoor heat exchanger for heat exchange between the circulating high- or low-pressure fluid and the indoor air, pipe-connected in succession, wherein two of said three ports of the valve base are pipe-connected respectively to the first and second heat exchangers.

3. A fluid compressor according to claim 2, wherein said fluid flowing through the first and second heat exchangers, decompressor, and fluid compressor is an HFC (Hydrofluorocarbons)-refrigerant.

4. A fluid compressor according to claim 1, wherein said drive means includes:

a permanent magnet fixed to the valve disk;

magnetic piece means opposed to the permanent magnet; and a magnetism generating unit connected to the magnetic piece means and adapted to magnetize the magnetic piece means so as to drive the permanent magnet to rotate the valve disk.

5. A fluid compressor according to claim 4, wherein said magnetism generating unit includes an electromagnet adapted to magnetize the magnetic piece means for a predetermined magnetic property to change the polarity of the magnetic piece means, as required, when supplied with a predetermined voltage.

6. A fluid compressor according to claim 5, wherein said electromagnet includes a coil winding connected with a temperature detecting means for detecting the temperature in the casing in accordance with the resistance of the coil winding.

7. A fluid compressor according to claim 4, wherein said magnetic piece means includes a pair of magnetic pieces to be magnetized for different magnetic properties.

8. A fluid compressor according to claim 1, wherein said valve disk is releasable from the other surface of the valve base, and is pressed against the other surface of the valve base by means of the pressure of the compressed high-pressure fluid filling the inside space of the casing when the compression means is actuated.

9. A fluid compressor according to claim 8, wherein said selector valve includes urging means for urging the valve disk toward the valve base, the urging means having an urging force of an intensity such that a gap is allowed to be formed between the valve disk and the valve base when the operation of the compression means is suspended.

10. A fluid compressor according to claim 1, wherein said compression means includes:

an electric motor adapted to be actuated when supplied with power; and a compression mechanism connected to the motor and adapted to be actuated by being driven by means of the motor.

11. A fluid compressor comprising:

a closed casing;

compression means provided in the casing for compressing an uncompressed low-pressure fluid and discharging a compressed high-pressure fluid into an inside space of the casing; and a selector valve including, a valve base attached to the casing in a manner such that one surface of the valve base is exposed to an outside region of the casing and that an other surface of the valve base is situated in the casing, and having circumferentially arranged four ports penetrating the valve base and opening in the one and the other surfaces of the valve base, a first valve disk rotatably mounted on the valve base in a manner such that one surface of the first valve disk faces the other surface of the valve base, and having a communication passage adapted to select two adjacent ports of said four ports in said valve base, and to make the selected two ports communicate with each other when the first valve disk rotates through a predetermined angle, and first and second through hole penetrating the first valve disk from the one surface thereof to the other, whereby two non-selected ports of the four ports open to an other surface the first valve disk when the valve disk rotates through a predetermined angle, a second valve disk rotatably mounted adjacent to the first valve disk in a manner such that one surface of the second valve disk faces the other surface of the first valve disk, and having a communication hole means penetrating the second valve disk from the one surface thereof to an other surface thereof, and adapted to select one through hole of said first and second through holes in said first valve disk, and to make the selected through holes open into the inside space of the casing when the second valve disk rotates through a predetermined angle, and a pipe for the uncompressed low-pressure fluid, the pipe connecting one of the four ports of the valve base and the compression means so that the uncompressed low-pressure fluid having flowed from the outside region of the casing into the selector valve and passed through the communication passage of the first valve disk is introduced into the compression means.

12. A fluid compressor according to claim 11, wherein said selector valve further includes closing means provided on the one surface of the second valve disk and adapted to close the other non-selected through hole of the first valve disk.

13. A fluid compressor according to claim 11, wherein said selector valve further includes:

first restricting means for restricting the angle of rotation of the first valve disk relative to the valve base within a predetermined first angle;

second restricting means for restricting the angle of relative rotation of the first and second valve disks within a predetermined second angle narrower than the first angle; and drive means used to drive the second valve disk and capable of also driving the first valve disk together with the second valve disk before the rotation of the first valve disk is restricted by the first restricting means when the relative rotation of the first and second valve disks is restricted by the second restricting means.

14. A fluid compressor according to claim 13, wherein said four ports of the valve base are arranged at intervals of 90° in the circumferential direction, and wherein said first angle is 90°.

15. A fluid compressor according to claim 14, wherein said first and second through holes of the first valve disk are located at a distance of 90° in the circumferential direction, said communication hole means of the second valve disk includes first and second communication holes located at a distance of 60° in the circumferential direction, said closing means of the second valve disk includes at least two closing portions located in positions deviated at 30° in the circumferential direction from the first and second communication holes, respectively, and capable of closing the first and second through holes, respectively, opening in the other surface of the first valve disk as the second valve disk rotates within a range of 30°, and wherein said second angle is 30° in the circumferential direction.

16. A fluid compressor according to claim 13, wherein said drive means includes:

a permanent magnet fixed to the second valve disk, magnetic piece means opposed to the permanent magnet; and a magnetism generating unit connected to the magnetic piece means and adapted to magnetize the magnetic piece means so as to drive the permanent magnet to rotate the valve disks by a force of repulsion or attraction produced between the magnetic piece means and the permanent magnet.

17. A fluid compressor according to claim 16, wherein said magnetism generating unit includes an electromagnet adapted to magnetize the magnetic piece means for a predetermined magnetic property to change the polarity of the magnetic piece means, as required, when supplied with a predetermined voltage.

18. A fluid compressor according to claim 16, wherein said magnetic piece means includes a pair of magnetic pieces to be magnetized for different magnetic properties.

19. A fluid compressor according to claim 17, wherein said electromagnet includes a coil winding connected with a temperature detecting means for detecting the temperature in the casing in accordance with the resistance of the coil winding.

20. A fluid compressor according to claim 13, wherein said first valve disk is releasable from the other surface of the valve base, and said second valve disk is releasable from the other surface of the second valve disk.

21. A fluid compressor according to claim 20, wherein said first and second valve disks are pressed toward the valve base by means of the pressure of the high-pressure fluid filling the inside of the casing when the compression means is actuated.

22. A fluid compressor according to claim 21, wherein said drive means has a driving torque smaller than a static frictional force produced between the one surface of the first valve disk and the other surface of the valve base during the operation of the compression means and greater than a static frictional force produced between the first and second valve disks.

23. A fluid compressor according to claim 11, wherein said fluid compressor is used in an air conditioner comprising a first outdoor heat exchanger for heat exchange between the circulating high- or low-pressure fluid and the outdoor air, a decompression means for decompressing and expanding the circulating high-pressure fluid, and a second indoor heat exchanger for heat exchange between the circulating high- or low-pressure fluid and the indoor air, pipe-connected in succession, and that two of said four ports of the valve base, including said port pipe connected with the low-pressure fluid pipe, are pipe-connected respectively to the first and second heat exchangers and the other one port is pipe-connected to a connecting pipe for connecting the first heat exchanger and the decompression means.

24. A fluid compressor according to claim 23, wherein said fluid flowing through the first and second heat exchangers decompression means, and fluid compressor is an HFC (Hydrofluorocarbons)-refrigerant.

25. A fluid compressor according to claim 11, wherein said compression means includes:

an electric motor adapted to be actuated when supplied with power; and a compression mechanism connected to the motor and adapted to be actuated by being driven by means of the motor.

\* \* \* \* \*